United States Patent
Kurabayashi

(10) Patent No.: US 11,282,279 B2
(45) Date of Patent: Mar. 22, 2022

(54) SYSTEM, ETC. FOR CREATING MIXED-REALITY ENVIRONMENT

(71) Applicant: CYGAMES, INC., Tokyo (JP)

(72) Inventor: Shuichi Kurabayashi, Tokyo (JP)

(73) Assignee: CYGAMES, INC., Tokyo (JP)

( * ) Notice: Subject to any disclaimer, the term of this patent is extended or adjusted under 35 U.S.C. 154(b) by 0 days.

(21) Appl. No.: 16/227,799

(22) Filed: Dec. 20, 2018

(65) Prior Publication Data

US 2019/0147658 A1 May 16, 2019

Related U.S. Application Data

(63) Continuation of application No. PCT/JP2017/007027, filed on Feb. 24, 2017.

(30) Foreign Application Priority Data

Jun. 20, 2016 (JP) .............................. JP2016-121928

(51) Int. Cl.
*G06T 19/00* (2011.01)
*G06T 7/90* (2017.01)
(Continued)

(52) U.S. Cl.
CPC .............. *G06T 19/006* (2013.01); *G06T 7/70* (2017.01); *G06T 7/90* (2017.01); *G06T 15/506* (2013.01);
(Continued)

(58) Field of Classification Search
None
See application file for complete search history.

(56) References Cited

U.S. PATENT DOCUMENTS 6,661,918 B1 * 12/2003 Gordon .................... G06K 9/38
 382/164
6,757,441 B1 6/2004 Katayama et al.
(Continued)

FOREIGN PATENT DOCUMENTS

| JP | 2001-186516 A | 7/2001 |
| JP | 2009-199284 A | 9/2009 |

(Continued)

OTHER PUBLICATIONS

Richard A. Newcombe, Shahram Izadi, Otmar Hilliges, David Molyneaux, David Kim, Andrew J. Davison, Pushmeet Kohli, Jamie Shotton, Steve Hodges, Andrew Fitzgibbon, "KinectFusion: Real-Time Dense Surface Mapping and Tracking", Oct. 29, 2011, IEEE, 10th IEEE International Symposium on Mixed and Augmented Reality.*

(Continued)

*Primary Examiner* — Robert Bader
(74) *Attorney, Agent, or Firm* — Osha Bergman Watanabe & Burton LLP

(57) ABSTRACT

A system that enables real-time recognition of a real-space environment in a mixed-reality environment includes a server, a portable display device including a display unit for displaying a virtual object to a user and a photographing unit that photographs a real space, and image acquisition devices that acquire images individually from a plurality of fixed points where it is possible to photograph a region in a predetermined real space, the system making it possible to render the virtual object in a superimposed fashion on a real space or a photographed image of the real space, viewed by the user via the display unit, the server or the display device including a three-dimensional-space-data storage part, a table storage part, a color-information determining part, a color-information updating part, a user-environment deter- (Continued)

mining part, a virtual-illumination-information generating part, and a rendering part.

14 Claims, 12 Drawing Sheets

(51) Int. Cl.
    *G06T 7/70*         (2017.01)
    *G06T 15/50*       (2011.01)
    *G06T 17/20*       (2006.01)
    *G06T 19/20*       (2011.01)

(52) U.S. Cl.
    CPC .............. *G06T 17/20* (2013.01); *G06T 19/20* (2013.01); *G06T 2207/10024* (2013.01); *G06T 2207/10028* (2013.01); *G06T 2207/30244* (2013.01); *G06T 2215/16* (2013.01); *G06T 2219/2012* (2013.01)

(56) References Cited

U.S. PATENT DOCUMENTS

| | | | | |
|---|---|---|---|---|
| 2005/0089194 | A1* | 4/2005 | Bell .................. | G06F 3/0425 382/103 |
| 2012/0194517 | A1* | 8/2012 | Izadi ................. | G06T 7/20 345/420 |
| 2013/0141421 | A1* | 6/2013 | Mount .............. | G02B 27/0172 345/419 |
| 2013/0271625 | A1* | 10/2013 | Gruber ............. | H04N 5/23212 348/239 |
| 2014/0160235 | A1* | 6/2014 | Norland ........... | H04N 7/181 348/37 |
| 2014/0184496 | A1 | 7/2014 | Gribetz et al. | |
| 2016/0210787 | A1* | 7/2016 | Chu .................. | G06T 19/006 |
| 2018/0095541 | A1 | 4/2018 | Gribetz et al. | |
| 2019/0278379 | A1 | 9/2019 | Gribetz et al. | |

FOREIGN PATENT DOCUMENTS

| | | |
|---|---|---|
| JP | 2013-69235 A | 4/2013 |
| KR | 10-2015-0103723 A | 9/2015 |

OTHER PUBLICATIONS

Shahram Izadi, David Kim, Otmar Hilliges, David Molyneaux, Richard Newcombe, Pushmeet Kohli, Jamie Shotton, Steve Hodges, Dustin Freeman, Andrew Davison, Andrew Fitzgibbon, "KinectFusion: Realtime 3D Reconstruction and Interaction Using a Moving Depth Camera", Oct. 19, 2011, ACM, UIST'11 Proceedings.*
Andrew Maimone, Henry Fuchs, "Real-Time Volumetric 3D Capture of Room-Sized Scenes for Telepresence", Oct. 17, 2012, IEEE, 2012 3DTV-Conference: The True Vision—Capture, Transmission and Display of 3D Video (3DTV-CON).*
Jonathan Ventura, Clemens Arth, Gerhard Reitmayr, Dieter Schmalstieg, "Global Localization from Monocular SLAM on a Mobile Phone", Apr. 2014, IEEE, IEEE Transactions on Visualization and Computer Graphics, vol. 20, No. 4, pp. 531-539.*
Yizhong Zhang, Weiwei Xu, Yiying Tong, Kun Zhou, "Online Structure Analysis for Real-Time Indoor Scene Reconstruction", Oct. 2014, ACM, ACM Transactions on Graphics (TOG), Nov. 2015, Article No. 159.*
International Search Report issued in Application No. PCT/JP2017/007027, dated Apr. 11, 2017 (4 pages).
Written Opinion issued in International Application No. PCT/JP2017/007027, dated Apr. 11, 2017 (4 pages).
Notification of Reasons for Refusal issued in Japanese Application No. 2016-121928, dated Nov. 21, 2016 (3 pages).
Agarwal, Sameer; et al.; "Building Rome in a day;" Communication of the ACM; Oct. 2011; vol. 54; No. 10; pp. 105-112; DOI=http://dx.doi.org/10.1145/2001269.2001293 (8 pages).
Office Action in counterpart Korean Patent Application No. 10-2019-7001631 dated Mar. 18, 2020 (9 pages).

* cited by examiner

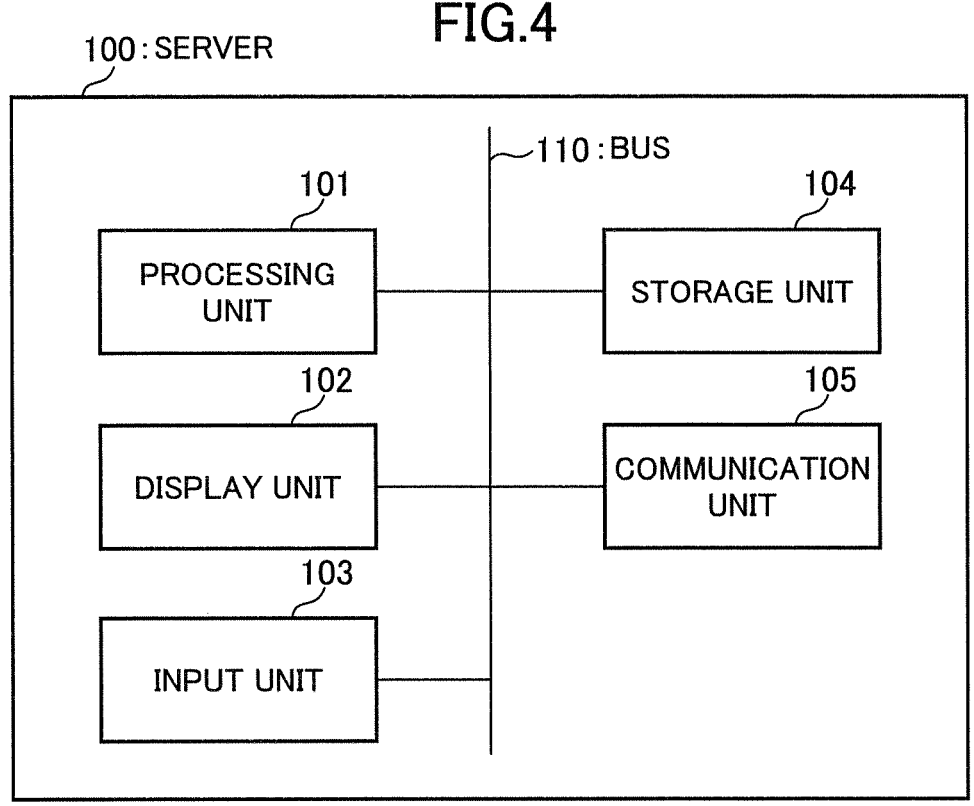
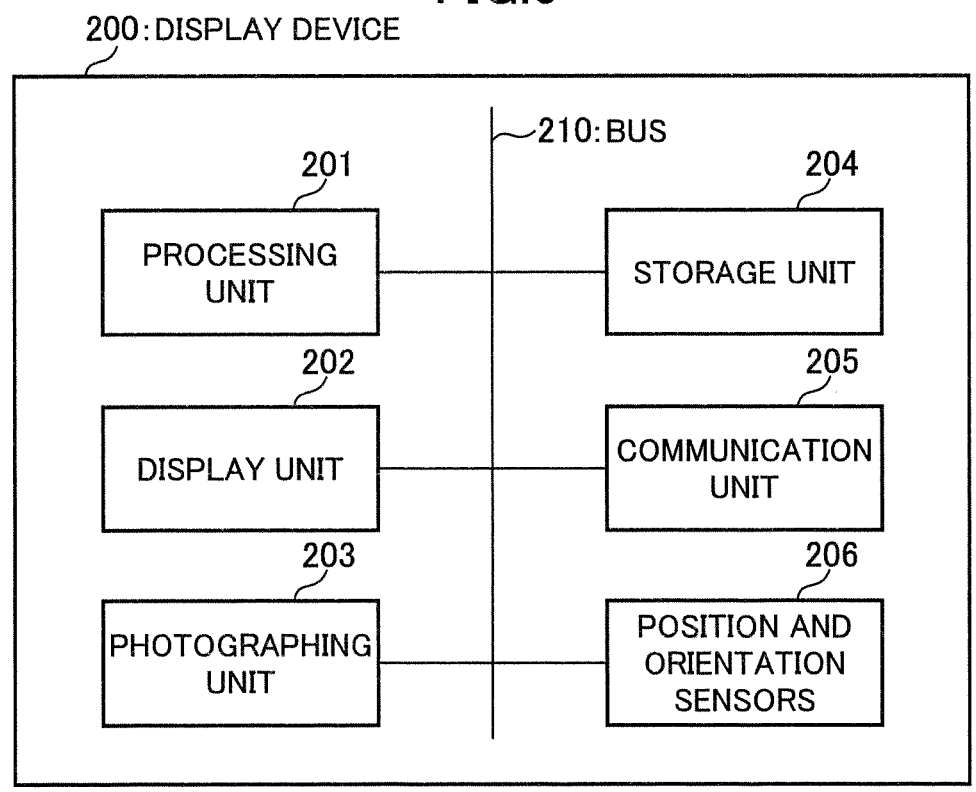

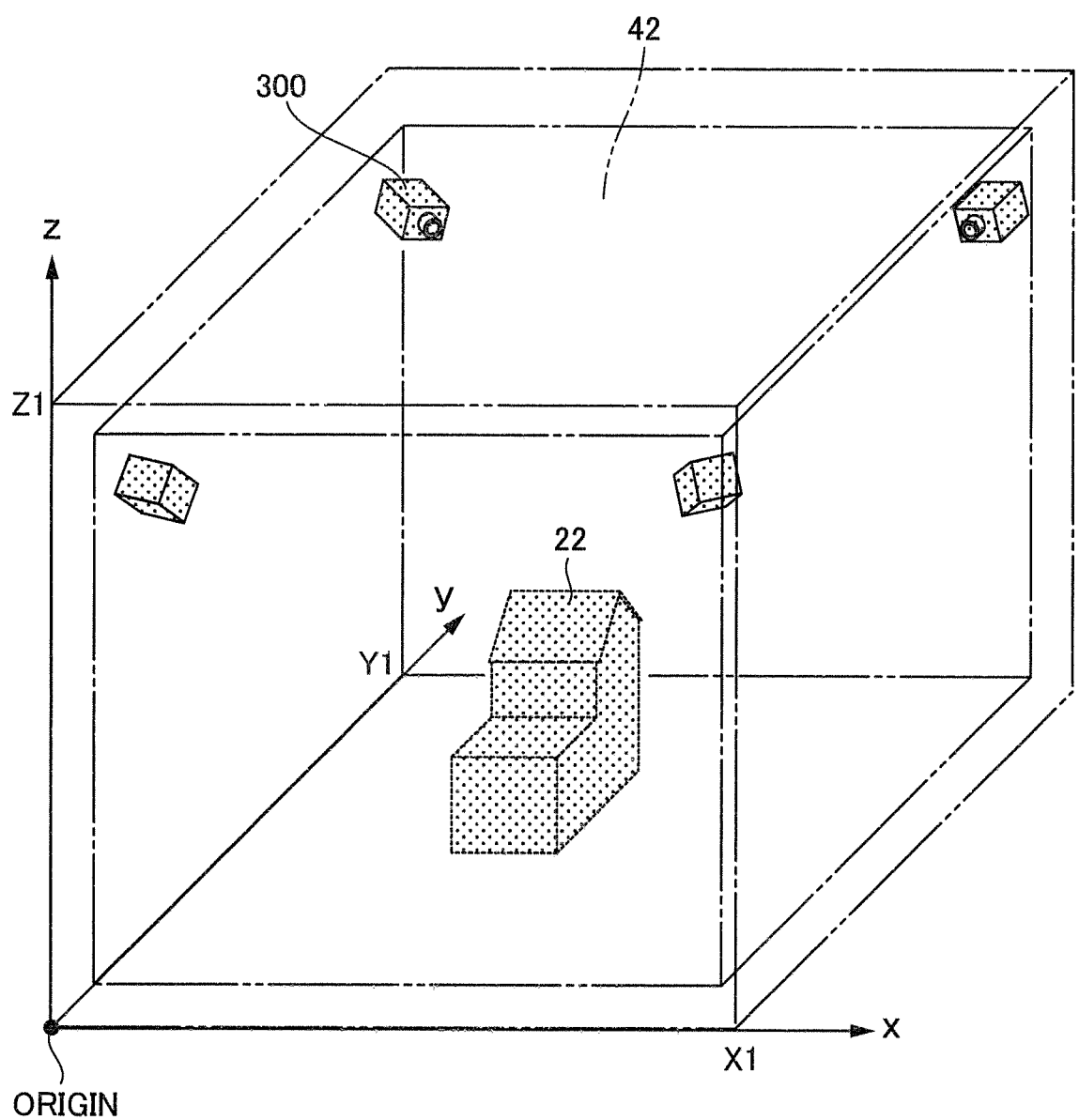

FIG.9
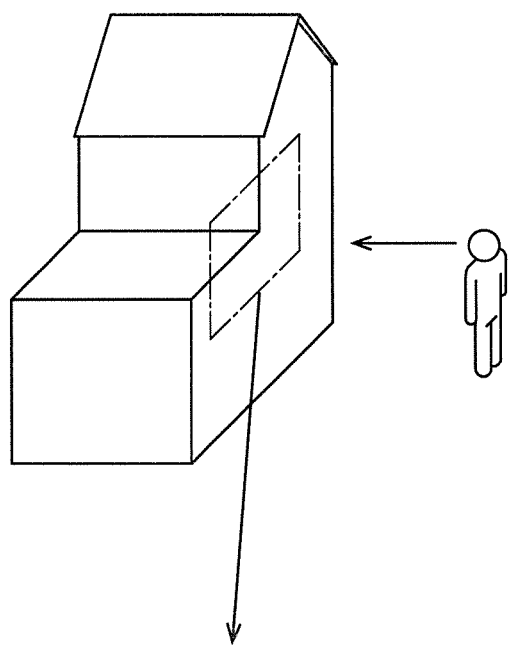
REGION PHOTOGRAPHED BY PHOTOGRAPHING UNIT
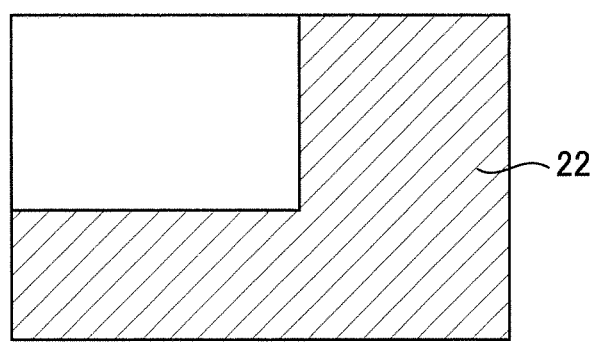

SYSTEM, ETC. FOR CREATING MIXED-REALITY ENVIRONMENT

TECHNICAL FIELD

The present invention relates to systems, particularly to a system that recognizes the environment of a real space in real time in a mixed-reality environment.

BACKGROUND ART

Recently, technology for mixed reality, called MR, is known as technology for integrating the real world with a virtual world seamlessly in real time. The technology makes it possible for a user experiencing it to perceive as if a virtual object existed there. MR technology is receiving interest in various fields. In order to realize MR technology, a user wears an optical see-through HMD (Head Mounted Display) or a video see-through HMD, which enables the user to view a mixed-reality image displayed in a superimposed fashion on the HMD.

As technologies for recognizing the real world as a 3D space, two methods are known: namely, a method in which a high-precision camera from the user's viewpoint is installed, and a method in which cameras are installed so as to surround an observation space.

As the method in which a high-precision camera from the user's viewpoint is installed, there is a method in which an infrared projector and an infrared camera are used. For example, as the method in which a high-precision camera from the user's viewpoint is installed, there is a method in which an infrared ray is radiated and the depth of an object is measured from a distortion in the reflection pattern of the infrared ray. Furthermore, as a method called time of flight (TOF), there is a method in which invisible light, such as an infrared ray, is radiated and the reflection thereof is measured to calculate the roundtrip distance to a target object. These methods suffer problems in that the range of space that can be handled three-dimensionally is limited to the range of reach of the infrared ray and in that it cannot be used with solar effects.

Furthermore, as a method of photographing three-dimensional information with extremely high precision, there is a method employing a 3D laser scanner. With this method, although it is possible to realize high measurement precision, it takes 10 minutes at the minimum, and about 30 minutes for a standard image quality, in order to perform measurement over 360 degrees. This prohibits the adoption of the method in real-time applications. Furthermore, 3D laser scanners cost a few million to a few tens of million yen each, which makes them unsuitable for mass deployment over a wide area. Because of these characteristics, 3D laser scanners are being used in applications in which sufficiently long time is afforded for high-precision 3D modeling, such as surveying in civil engineering and layout confirmation in a factory. For example, in the technology realized according to Patent Literature 1, the colors of an image photographed by a camera are assigned to point cloud data created by scanning by means of a 3D image scanner, making it possible to realize the real world as a 3D space.

As a method in which a plurality of cameras are installed so as to surround an observation space, there is a method in which original three-dimensional information is restored from a plurality of separately photographed images by using a technology called Structure-from-Motion (SfM), which is described in Non-Patent Literature 1. A well-known product that adopts this method is Microsoft Photosynth (registered trademark). Although the precision realized by SfM is relatively low compared with the precision required for MR technology, SfM is a method that makes it possible to construct 3D models inexpensively. However, SfM has only low real-time properties and cannot be directly applied for the implementation of an MR environment.

As described above, with these methods, it is not possible to simultaneously realize real-time properties and high-precision measurement. Therefore, it is difficult to photograph a background such as a building with high precision and to recognize changes in indirect illumination due to movement of the sun or movement of a person.

CITATION LIST

Patent Literature

{PTL 1}
Japanese Unexamined Patent Application, Publication No. 2013-69235

Non Patent Literature

{NPL 1}
Sameer Agarwal, Yasutaka Furukawa, Noah Snavely, Ian Simon, Brian Curless, Steven M. Seitz, and Richard Szeliski. 2011. Building Rome in a day. Commun. ACM 54, 10 (October 2011), 105-112. DOI=http://dx.doi.org/10.1145/2001269.2001293

SUMMARY OF INVENTION

Technical Problem

As described above, there has not yet been any established method of recognizing a structure or environment in the real world in real time and with high precision and reflecting the result in a virtual space. This is a problem, for example, when realizing high-quality global illumination for a virtual object that is rendered or position tracking of a user (HMD) in an MR environment.

The present invention has been made in order to solve this problem, and it is an object thereof to provide a system that makes it possible to realize the environment of a real space in real time in a mixed-reality environment.

Solution to Problem

In order to achieve the above object, a system according to an aspect of the present invention is a system including a server, a portable display device including a display unit for displaying a virtual object to a user and a photographing unit that photographs a real space, and image acquisition devices that acquire images individually from a plurality of fixed points where it is possible to photograph a region in a predetermined real space, the system making it possible to render the virtual object in a superimposed fashion on a real space or a photographed image of the real space, viewed by the user via the display unit, the system being characterized in that the server or the display device includes a three-dimensional-space-data storage part configured to store three-dimensional space data created on the basis of point cloud data, obtained in advance, of real objects located in the predetermined real space and constituted of three-dimensional shape elements each having three-dimensional position information; a table storage part configured to store a table in which position information of each of the pixels of images acquired by the image acquisition devices is associated with the three-dimensional position information of one or more of the three-dimensional shape elements represented by that pixel; a color-information determining part configured to determine color information of the three-dimensional shape elements on the basis of color information of the one or more of the pixels associated with the three-dimensional shape elements; a color-information updating part configured to update the color information of the three-dimensional shape elements on the basis of changes in the color information of the individual pixels of the images acquired by the image acquisition devices; a user-environment determining part configured to determine a position of the display device and a photographing direction of the photographing unit; a virtual-illumination-information generating part configured to generate virtual illumination information for the virtual object to be rendered on the basis of the color information and three-dimensional position information of the three-dimensional shape elements; and a rendering part configured to render the virtual object on the display unit on the basis of the position of the display device, the photographing direction of the photographing unit, and the virtual illumination information.

According to the present invention configured as described above, by using the table in which the position information of the three-dimensional shape elements (e.g., meshes or voxels) constituting the three-dimensional space data is associated with the position information of the individual pixels of the images acquired by the image acquisition devices (e.g., stationary cameras), the color information of the three-dimensional shape elements is determined and updated on the basis of the color information of the pixels of the images acquired by the image acquisition devices. By using the table in this manner, it becomes possible to reflect, in real time, the color information obtained from the image acquisition devices to the individual three-dimensional shape elements.

Furthermore, in the present invention, preferably, the virtual-illumination-information generating part generates, as virtual illumination information for the virtual object to be rendered, virtual illumination information on the individual faces of a virtual polyhedron accommodating the virtual object to be rendered on the basis of the color information and three-dimensional position information of the three-dimensional shape elements.

According to the present invention configured as described above, for a virtual object to be rendered, a virtual polyhedron accommodating the virtual object is assumed, and the states of colors (light) on the individual faces of the polyhedron are determined from individual three-dimensional shape elements reflecting colors in the real space. Then, the determined states of colors on the individual faces are used as virtual indirect illumination for the virtual object that is rendered. This makes it possible to render a virtual object having colors and shades closer to those of the environment in the real space.

Furthermore, in the present invention, preferably, the display device further includes position and orientation sensors, and the user-environment determining part considers a position of the display device and a photographing direction of the photographing unit, acquired by the position and orientation sensors, as a provisional user environment, obtains, from the three-dimensional-space-data storage part, the three-dimensional shape elements that can be photographed by the photographing unit at positions and in directions within a predetermined range from the provisional user environment, and determines the position of the display device and the photographing direction of the photographing unit on the basis of the color information and three-dimensional position information of the obtained three-dimensional shape elements and the photographed image of the real space.

According to the present invention configured as described above, a rough position of the display device and photographing direction of the photographing unit, determined by using the position and orientation sensors, are considered as a provisional user environment, and the position of the display device and the photographing direction of the photographing unit are determined by comparing the color information and three-dimensional position information of three-dimensional shape elements located in a region that can be photographed by the photographing unit in the vicinity of the provisional user environment with the image photographed by the photographing unit for the purpose of matching. Here, usually, the position of the display device corresponds to the position of the user, and the photographing direction of the photographing unit corresponds to the direction in which the user is facing.

As described above, by performing matching between rough position information obtained from the conventional position and orientation sensors and a high-precision virtual space based on three-dimensional space data, it is possible to correct, in real time, deviations in the position of the user and the direction in which the user is facing between the real space and the virtual space. This makes it possible to realize an MR environment linked with the reality with high precision, which makes it possible to realize position tracking.

Furthermore, in this invention, preferably, the three-dimensional shape elements are meshes constituted of polygons created on the basis of point cloud data, obtained in advance, of real objects located in the predetermined real space.

According to the present invention configured as described above, it is possible to use meshes as the three-dimensional shape elements.

Furthermore, in order to achieve the above object, a display device according to an aspect of the present invention is a portable display device including a display unit for displaying a virtual object to a user and a photographing unit that photographs a real space, the display device making it possible to render the virtual object in a superimposed fashion on a real space or a photographed image of the real space, viewed by the user via the display unit, the display device being characterized by including a three-dimensional-space-data storage part configured to store three-dimensional space data created on the basis of point cloud data, obtained in advance, of real objects located in a predetermined real space and constituted of three-dimensional shape elements each having three-dimensional position information; a table storage part configured to store a table in which position information of each of the pixels of images individually acquired from a plurality of fixed points where it is possible to photograph a region in the predetermined real space is associated with the three-dimensional position information of one or more of the three-dimensional shape elements represented by that pixel; a color-information determining part configured to determine color information of the three-dimensional shape elements on the basis of color information of the one or more of the pixels associated with the three-dimensional shape elements; a color-information updating part configured to update the color information of the three-dimensional shape elements on the basis of changes in the color information of the individual pixels of the acquired images; a user-environment determining part configured to determine a position of the display device and a photographing direction of the photographing unit; a virtual-illumination-information generating part configured to generate virtual illumination information for the virtual object to be rendered on the basis of the color information and three-dimensional position information of the three-dimensional shape elements; and a rendering part configured to render the virtual object on the display unit on the basis of the position of the display device, the photographing direction of the photographing unit, and the virtual illumination information.

According to the present invention configured as described above, the technology realized by the above system can be realized by means of the display device.

Furthermore, in order to achieve the above object, a system according to an aspect of the present invention is a system including a server, and a portable display device including a display unit for displaying a three-dimensional virtual object to a user, a photographing unit that photographs a real space, and position and orientation sensors, the system making it possible to render the virtual object in a superimposed fashion on a real space or a photographed image of the real space, viewed by the user via the display unit, the system being characterized in that the server or the display device includes a three-dimensional-space-data storage part configured to store three-dimensional space data created on the basis of point cloud data, obtained in advance, of real objects located in a predetermined real space and constituted of three-dimensional shape elements each having color information and three-dimensional position information; and a user-environment determining part configured to consider a position of the display device and a photographing direction of the photographing unit, acquired by the position and orientation sensors, as a provisional user environment, to obtain, from the three-dimensional-space-data storage part, the three-dimensional shape elements that can be photographed by the photographing unit at positions and in directions within a predetermined range from the provisional user environment, and to determine the position of the display device and the photographing direction of the photographing unit on the basis of the color information and three-dimensional position information of the obtained three-dimensional shape elements and the photographed image of the real space.

According to the present invention configured as described above, a rough position of the display device and photographing direction of the photographing unit, determined by using the position and orientation sensors, are considered as a provisional user environment, and the position of the display device and the photographing direction of the photographing unit are determined by comparing the color information and three-dimensional position information of three-dimensional shape elements located in a region that can be photographed by the photographing unit in the vicinity of the provisional user environment with the image photographed by the photographing unit for the purpose of matching.

As described above, by performing matching between rough position information obtained from the conventional position and orientation sensors and a high-precision virtual space based on three-dimensional space data, it is possible to correct, in real time, deviations in the position of the user and the direction in which the user is facing between the real space and the virtual space. This makes it possible to realize an MR environment linked with the reality with high precision, which makes it possible to realize position tracking.

Furthermore, in order to achieve the above object, a method according to an aspect of the present invention is a method of rendering a virtual object in a superimposed fashion on a real space or a photographed image of the real space, viewed by a user via a display unit of a portable display device in a predetermined real space, the method being characterized by including a step of acquiring images individually from a plurality of fixed points where it is possible to photograph a region in the predetermined real space; a step of determining color information of three-dimensional shape elements having three-dimensional position information, constituting three-dimensional space data created on the basis of point cloud data, obtained in advance, of real objects located in the predetermined real space, on the basis of color information of pixels of the acquired images at positions corresponding to the three-dimensional shape elements; a step of updating the color information of the three-dimensional shape elements on the basis of changes in the color information of the individual pixels of the acquired images; a step of determining a position of the display device and a photographing direction of a photographing unit included in the display device; a step of generating virtual illumination information for the virtual object to be rendered on the basis of the color information and three-dimensional position information of the three-dimensional shape elements; and a step of rendering the virtual object on the display unit on the basis of the position of the display device, the photographing direction of the photographing unit, and the virtual illumination information.

Furthermore, in order to achieve the above object, a program according to an aspect of the present invention is a program for a system including a server, a portable display device including a display unit for displaying a virtual object to a user and a photographing unit that photographs a real space, and image acquisition devices that acquire images individually from a plurality of fixed points where it is possible to photograph a region in a predetermined real space, the program making it possible to render the virtual object in a superimposed fashion on a real space or a photographed image of the real space, viewed by the user via the display unit, the program being characterized by allowing the server to execute a step of obtaining images from the display device; a step of determining color information of three-dimensional shape elements having three-dimensional position information, constituting three-dimensional space data created on the basis of point cloud data, obtained in advance, of real objects located in the predetermined real space, on the basis of color information of pixels of the images acquired by the image acquisition devices at positions corresponding to the three-dimensional shape elements; a step of updating the color information of the three-dimensional shape elements on the basis of changes in the color information of the individual pixels of the images acquired by the image acquisition devices; a step of determining a position of the display device and a photographing direction of the photographing unit; a step of generating virtual illumination information for the virtual object to be rendered on the basis of the color information and three-dimensional position information of the three-dimensional shape elements; and a step of rendering the virtual object on the display unit on the basis of the position of the display device, the photographing direction of the photographing unit, and the virtual illumination information.

Furthermore, in order to achieve the above object, a method according to an aspect of the present invention is a method of creating a mixed-reality environment for rendering a three-dimensional virtual object in a superimposed fashion on a real space or a photographed image of the real space, viewed by a user via a display unit of a portable display device in a predetermined real space, the method being characterized by including a step of creating three-dimensional space data constituted of three-dimensional shape elements each having three-dimensional position information, on the basis of point cloud data of real objects located in the predetermined real space; a step of acquiring images individually from a plurality of fixed points where it is possible to photograph a region in the predetermined real space; a step of creating a table in which position information of each of the pixels of the acquired images is associated with the three-dimensional position information of one or more of the three-dimensional shape elements represented by that pixel; and a step of determining color information of the three-dimensional shape elements on the basis of color information of one or more of the pixels associated with the three-dimensional shape elements.

According to the present invention configured as described above, three-dimensional space data that represents a predetermined real space including real objects in a virtual space is created, images are obtained from stationary cameras, etc., a table in which the position information of three-dimensional shape elements constituting the three-dimensional space data is associated with the position information of the individual pixels of the images acquired by the stationary cameras, etc. is created, and the color information of the three-dimensional shape elements is determined by using the table.

This makes it possible to reflect the states of colors (states of light) in the real space to the color information of the three-dimensional shape elements in real time and with high precision. As a result, it becomes possible to realize a mixed-reality environment in which the states of colors in the real space are reflected in real time and with high precision.

Furthermore, in the present invention, preferably, the method further includes a step of updating the color information of the three-dimensional shape elements on the basis of changes in the color information of the individual pixels of the acquired images.

Furthermore, in order to achieve the above object, a system according to an aspect of the present invention is a system for creating a mixed-reality environment for rendering a three-dimensional virtual object in a superimposed fashion on a real space or a photographed image of the real space, viewed by a user via a display unit of a portable display device in a predetermined real space, the system being characterized by including a three-dimensional-space-data creating part configured to create three-dimensional space data constituted of three-dimensional shape elements each having three-dimensional position information, on the basis of point cloud data of real objects located in the predetermined real space; an image acquisition part configured to acquire images individually from a plurality of fixed points where it is possible to photograph a region in the predetermined real space; a table creating part configured to create a table in which position information of each of the pixels of the acquired images is associated with the three-dimensional position information of one or more of the three-dimensional shape elements represented by that pixel; and a color-information determining part configured to determine color information of the three-dimensional shape elements on the basis of color information of one or more of the pixels associated with the three-dimensional shape elements.

Furthermore, in order to achieve the above object, a data structure according to an aspect of the present invention is a data structure for creating a mixed-reality environment for rendering a three-dimensional virtual object in a superimposed fashion on a real space or a photographed image of the real space, viewed by a user via a display unit of a portable display device in a predetermined real space, the data structure being characterized by including two-dimensional coordinate data representing position information of individual pixels of images acquired individually from a plurality of fixed points where it is possible to photograph a region in the predetermined real space; and three-dimensional coordinate data representing three-dimensional position information of three-dimensional shape elements associated with the individual pixels, the three-dimensional shape elements constituting three-dimensional space data created on the basis of point cloud data of real objects located in the predetermined real space.

According to the present invention configured as described above, the data structure includes a table in which position information of three-dimensional shape elements constituting three-dimensional space data that represents a predetermined real space including real objects in a virtual space is associated with the position information of the individual pixels of images acquired by the image acquisition devices (e.g., stationary cameras). By using this table, it becomes possible to determine and update the color information of the three-dimensional shape elements from the color information of the pixels of images acquired by stationary cameras or the like.

Advantageous Effects of Invention

The present invention makes it possible to recognize the environment of a real space in real time in a mixed-reality environment.

BRIEF DESCRIPTION OF DRAWINGS

FIG. 4 is a block diagram showing the hardware configuration of a server according to the embodiment of the present invention.

FIG. 5 is a block diagram showing the hardware configuration of a display device according to the embodiment of the present invention.

FIG. 6c shows three-dimensional space data represented by point cloud data acquired in the real space in FIG. 6a.

FIG. 9 is an illustration for explaining the direction a user is facing and the photographing direction of a photographing unit 203 according to the embodiment of the present invention.

DESCRIPTION OF EMBODIMENTS

Now, a system according to an embodiment of the present invention, which serves to provide a user with a mixed reality space in which a virtual space and a real space are mixed together, will be described with reference to the drawings.

One of the technical features of the system according to the embodiment of the present invention is that a high-precision three-dimensional virtual space having a structure and colors matching those of a real space with extremely high precision is generated. This makes it possible to realize: (1) global illumination utilizing a state of light in the real world; and (2) high-precision position tracking of a user.

Figure 2:
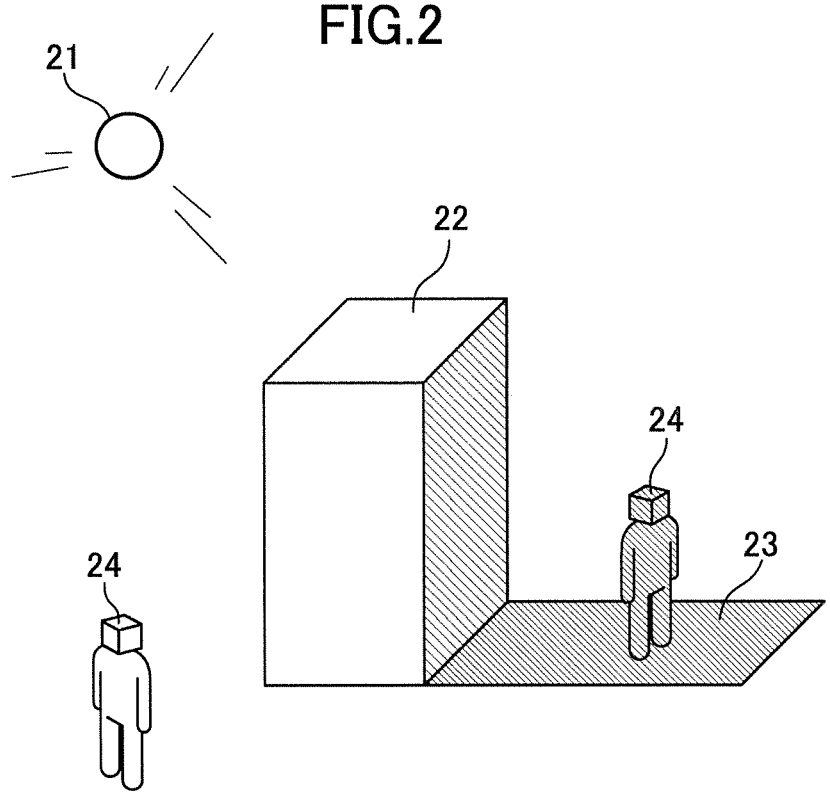
FIG. 2 is an illustration showing an overview of global illumination utilizing the state of light in the real world according to the embodiment of the present invention.

An overview of (1) global illumination utilizing a state of light in the real world will be described. The system according to the embodiment of the present invention assumes a manner of operation of an MR environment in which computer graphics (CG) occupy only a small portion of a screen, like a game character. For example, in FIG. 2, when a character 24, which is a virtual object (i.e., CG) existing in a virtual space, enters a shadow 23 formed from a building 22 in a real space by a light source 21 in the real space, the lightness of the image of the character 24 is changed in accordance with the darkness (brightness) in that place. The system according to the embodiment of the present invention calculates the lightness of the character image from the lightness in the color information of three-dimensional space data (e.g., 3D meshes or voxels) of a building and a floor and renders the character image accordingly, thereby realizing a character display matching the state of light in the real world.

Figure 3:
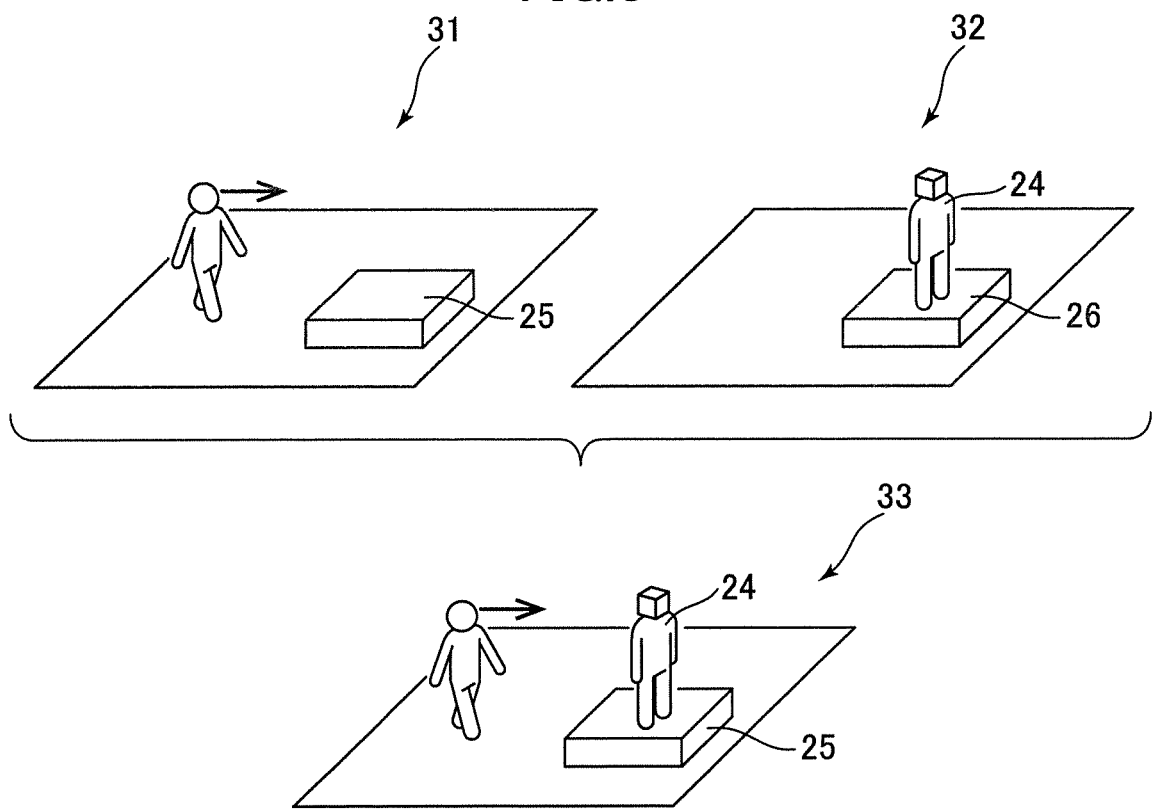
FIG. 3 is an illustration showing an overview of position tracking according to the embodiment of the present invention.

An overview of (2) high-precision position tracking of a user will be described. FIG. 3 shows a real world 31 in which a user is present, a virtual world 32 constructed from three-dimensional space data (DB), and a mixed reality world (MR environment) 33 generated by matching the real world 31 and the virtual world 32 together. In the MR environment 33, generally, the user wears a device having a display unit, such as an HMD. Although an HMD is equipped with various kinds of sensor devices, the measurement precisions of sensors that are conventionally used are not high enough to recognize the structure of the real world 31 with high precision and to realize the MR environment 33 such that the result of recognition is reflected in the virtual world 32.

Thus, the system according to the embodiment of the present invention performs matching between the high-precision virtual space 32 and rough position information obtained from various kinds of sensors that are conventionally used (e.g., a distance sensor, an image sensor, a direction sensor, a GPS sensor, and a Bluetooth (registered trademark) beacon) and corrects, in real time, deviations in the user's position and the direction in which the user is facing between the real world 31 and the virtual world 32. Thus, the MR environment 33 that is linked with reality with high precision is realized, whereby position tracking is realized. In the MR environment 33 described above, in the case where the character 24 is made to stand on a pedestal 26, which is a virtual object in the virtual world 32, the user can see the character 24 standing on a pedestal 25 in the real world 31, without feeling a sense of unnaturalness.

The above-described system according to the embodiment of the present invention is realized in a predefined real space (predetermined real space). The system according to the embodiment of the present invention is configured to include: a generation phase in which the states of real objects existing in a predetermined real space, such as a building and a bench, are recognized and a high-precision three-dimensional space is generated; and a recognition phase in which the state of light in the real space is recognized and mapped to the high-precision three-dimensional space in order to let a user present in the predetermined real space experience a sense of mixed reality. The following describes a specific configuration.

[System Configuration]

Figure 1:
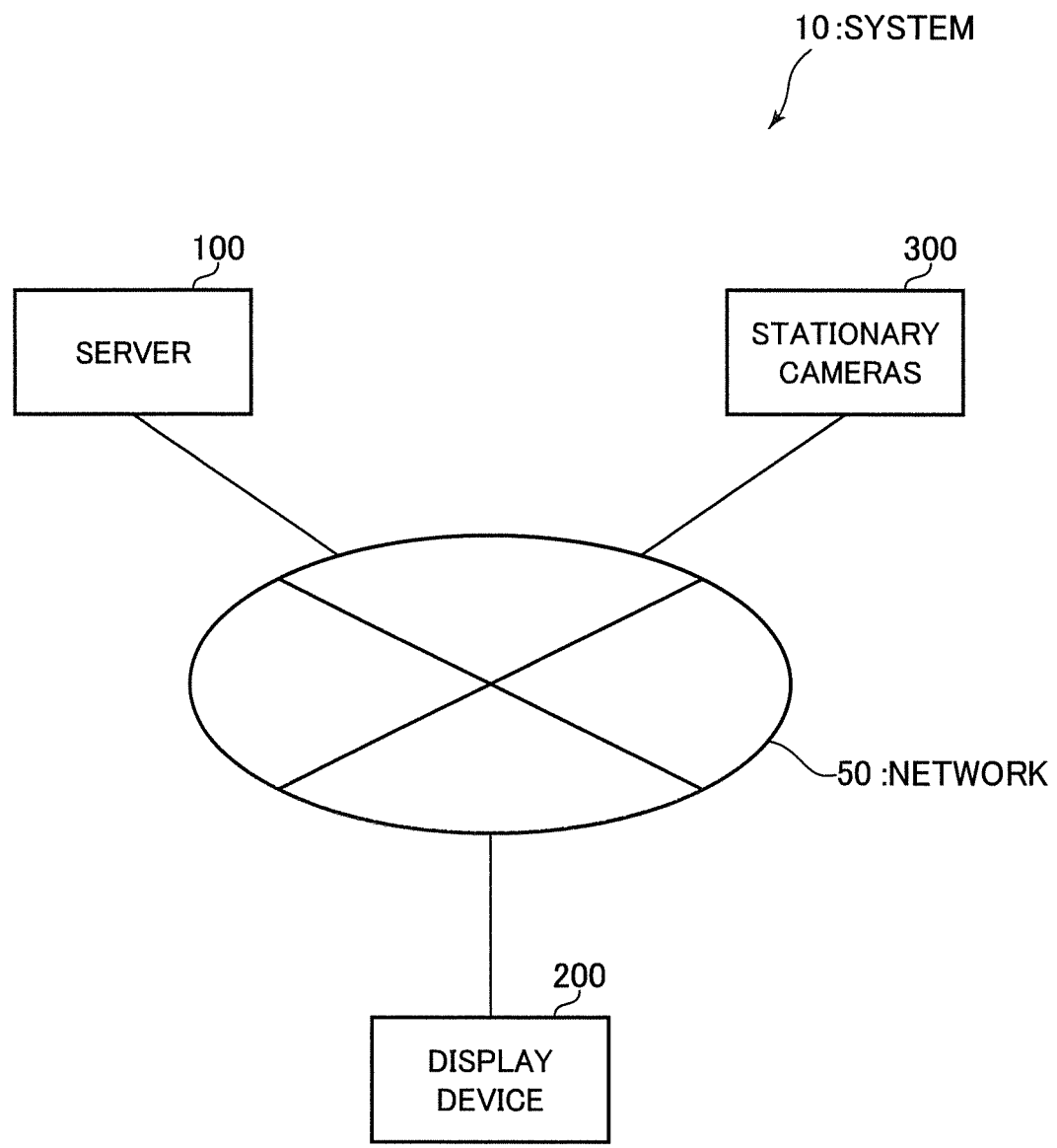
FIG. 1 is an overall configuration diagram of a system according to an embodiment of the present invention.

FIG. 1 is an example of an overall configuration diagram of a system 10 according to the embodiment of the present invention. As shown in FIG. 1, the system 10 includes a server 100, one or more display devices 200, and one or more image acquisition devices 300. The server 100, the display devices 200, and the image acquisition devices 300 are connected to a network 50, such as the Internet, so as to be able to carry out communications with each other.

The system 10 is assumed to be a server-client system, and preferably, the display devices 200 and the image acquisition devices 300 carry out communications only with the server 100. Alternatively, however, the system 10 may be configured as a system not including a server, such as a P to P system.

The system 10 allows a user present in a predetermined real space to experience a sense of mixed reality. The predetermined real space is a predefined indoor or outdoor real space, and real objects, which are objects in the real world, exist in that space. For example, the real objects are structures such as a building, a bench, and a wall, which are stationary in the real space. However, mobile items may be included in the real objects.

FIG. 4 is a block diagram showing the hardware configuration of the server 100 according to the embodiment of the present invention. The server 100 includes a processing unit 101, a display unit 102, an input unit 103, a storage unit 104, and a communication unit 105. These components are connected to each other via a bus 110. Alternatively, however, the components may be connected to each other individually as needed.

The processing unit 101 includes a processor (e.g., a CPU) that controls the individual components of the server 100, and executes various kinds of processing by using the storage unit 104 as a work area. In the case where the server 100 renders virtual objects, the processing unit 101 preferably includes a GPU that executes rendering processing, separately from the CPU. The display unit 102 has functionality for displaying information to a server user. The input unit 103 has functionality for accepting inputs from the server user, like a keyboard and a mouse.

The storage unit 104 includes a hard disk, a main memory, and a buffer memory. The hard disk stores programs. Alternatively, however, in place of the hard disk, any type of non-volatile storage or non-volatile memory that can store information and that may be removable may be used. The storage unit 104 stores programs and various kinds of data that may be referred to in relation to the execution of the programs. In the case where the processing unit 101 includes a GPU, the storage unit 104 may include video memory.

In one example, the programs are one or more programs for displaying and moving virtual objects via the display devices 200 in relation to the user's position, direction, and actions, and the various kinds of data include virtual object data of 3D characters, etc. to be rendered.

The storage unit 104 can store data (e.g., tables) and programs for various kinds of databases. The various kinds of databases are realized by the operation of the processing unit 101, etc. For example, the server 100 may include the functionality of a database server, may include a database server, or may include or be provided with other kinds of servers.

The communication unit 105 carries out wired communications using an Ethernet (registered trademark) cable or the like or wireless communications such as mobile communications or wireless LAN communications to connect to the network 50.

The various functions of the server 100 are realized by executing programs; alternatively, however, some of the functions may be realized by configuring electronic circuits or the like.

In one example, when the server 100 performs rendering, the CPU writes a rendering command in the main memory, and the GPU refers to the rendering command and writes rendering data in a frame buffer on the video memory. Then, the server 100 sends the data read from the frame buffer as is to the display device 200.

In one example, the server 100 is configured by combining a plurality of servers provided for individual functions or individual areas. For example, it is possible to divide a predetermined real space into a plurality of areas, install servers one per area, and install a server that integrates those servers.

FIG. 5 is a block diagram showing the hardware configuration of the display device 200 according to the embodiment of the present invention. The display device 200 includes a processing unit 201, a display unit 202, a photographing unit 203, a storage unit 204, a communication unit 205, and position and orientation sensors 206. These components are connected to each other via a bus 210. Alternatively, however, the components may be connected to each other individually as needed.

The processing unit 201 includes a processor (e.g., a CPU) that controls the individual components of the display device 200, and executes various kinds of processing by using the storage unit 204 as a work area. In the case where the display device 200 performs rendering, the processing unit 201 preferably includes a GPU that executes rendering processing, separately from the CPU. In one example, the display device 200 receives a rendering command from the server 100 and executes rendering processing.

The storage unit 204 includes a hard disk, a main memory, and a buffer memory. The hard disk stores programs. Alternatively, however, in place of the hard disk, any type of non-volatile storage or non-volatile memory that can store information and that may be removable may be used. The storage unit 204 stores programs and various kinds of data that may be referred to in relation to the execution of the programs. Furthermore, the storage unit 204 can store data and programs for various kinds of databases. The various kinds of databases are realized by the operation of the processing unit 201, etc. In the case where the processing unit 201 includes a GPU, the storage unit 204 may include a video memory.

The display unit 202 is a transparent display, a semi-transparent display, or a non-transparent display that displays virtual objects to the user.

The photographing unit 203 photographs the real space and stores captured images (images of the real world) of the individual frames, for example, in the storage unit 204. Preferably, the area photographed by the photographing unit 203 is the same as the visual field of the user carrying or wearing the display device 200.

The display device 200 can be carried by the user and is preferably a head-mounted image display device (HMD) that can be worn on the head. Hereinafter, it is assumed that an HMD 200 is used as the display device 200 in this embodiment. The HMD 200 may be an optical see-through HMD or a video see-through HMD.

The optical see-through HMD includes a display unit 202 implemented by a transparent display. The optical see-through HMD allows a user wearing the HMD to visually recognize the real space through the display unit 202 and provides a mixed-reality image by rendering virtual objects in a superimposed fashion on the display unit 202.

The video see-through HMD includes a display unit 202 implemented by a non-transparent display. The video see-through HMD allows a user wearing the HMD to visually recognize a photographed image of the real space through the display unit 202 and provides a mixed-reality image by rendering virtual objects in a superimposed fashion on the display unit 202.

Alternatively, the display device 200 may be a display device of the type manually held by a user (a hand held display).

The position and orientation sensors 206 include a GPS unit, a gyro sensor, and an accelerometer and determine, in real time, a rough position of the display device and a rough photographing direction of the photographing unit 203 of the display device (or the direction the display unit 202 is facing). The position and orientation sensors 206 may include other kinds of sensors that are conventionally used.

The communication unit 205 carries out wireless communications such as mobile communications or wireless LAN communications to connect to the network 50. In one example, the communication unit 205 sends image data photographed by the photographing unit 203 to the server 100 via the network 50.

The image acquisition devices 300 acquire videos (images) of the real space and send the acquired image data to the server 100 or the display device 200 via the network 50. Furthermore, the image acquisition devices 300 are installed as stationary equipment at fixed points surrounding a predetermined real space so as to be capable of photographing a region viewable by a user present in the predetermined real space.

In one example, the image acquisition devices 300 are stationary cameras installed at fixed points. Furthermore, in one example, the image acquisition devices 300 acquire 30 image frames per second and sends the image frames to the server 100. Hereinafter, it is assumed that stationary cameras 300 are used as the image acquisition devices 300 in this embodiment.

First Embodiment

Figure 6A:
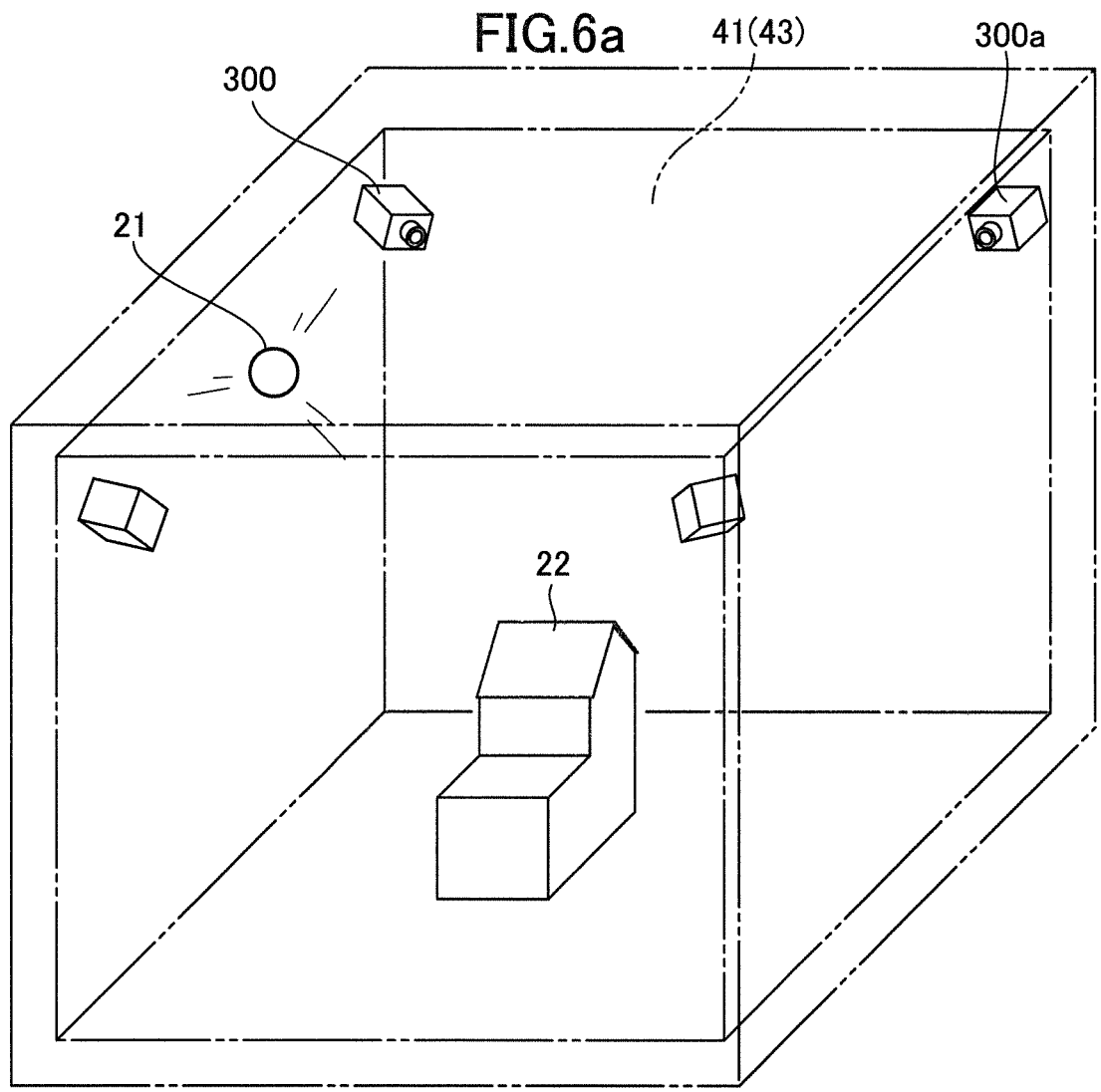
FIG. 6a is a schematic illustration of a real space according to the embodiment of the present invention.
Figure 6B:
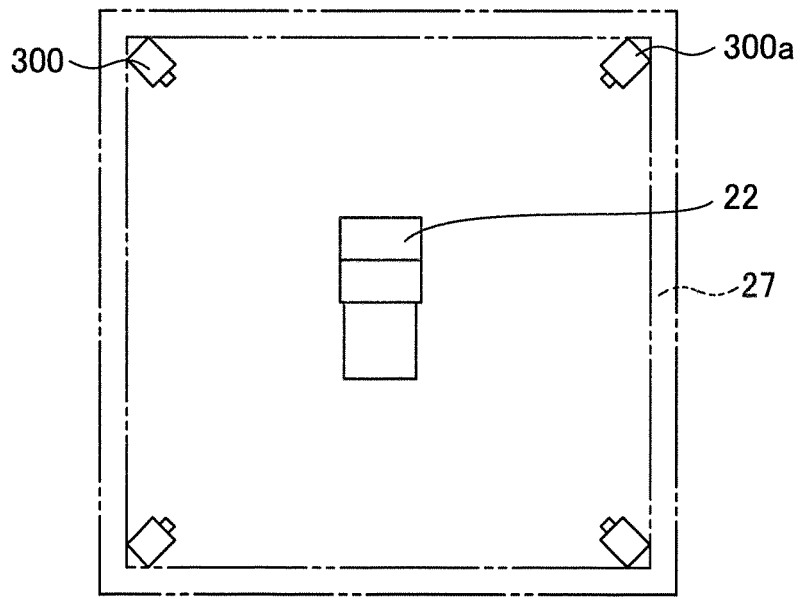
FIG. 6b is a plan view of the real space in FIG. 6a as viewed from above.

As a real-world space (predetermined real space) in which the system 10 according to the embodiment of the present invention provides a user with a mixed-reality environment 43, a real space 41, which is an indoor space enclosed by walls 27, as shown in FIG. 6, is assumed. FIG. 6a is a schematic illustration of the real space 41, and FIG. 6b is a plan view of the real space 41 as viewed from above. In the real space 41, a light source 21 in the real world and a building 22 that is a real object in the real world exists. As shown in FIG. 6, in the real space 41, a plurality of stationary cameras 300 are installed so as to make it possible to photograph a space viewable by a user present in an observation space, i.e., the real space 41.

In the embodiment of the present invention, point cloud data representing the three-dimensional shapes of real objects in the real space 41 are obtained in advance, for example, by using a high-precision laser scanner (not shown). It is preferred to obtain the point cloud data after installing the stationary cameras 300 in the real space 41, and it is also preferred to obtain image data from the stationary cameras 300 simultaneously when the point cloud data are obtained. Alternatively, however, the stationary cameras 300 may be installed after obtaining point cloud data by using a laser scanner. FIG. 6c shows an example of three-dimensional space data represented by the point cloud data obtained in the real space 41.

As shown in FIG. 6c, each piece of the point cloud data has three-dimensional coordinates (x, y, z) and is located in a virtual space 42 associated with the real space 41. Furthermore, each piece of the point cloud data is colored point cloud data including color information. The colored point cloud data is created by mapping color information obtained from images photographed separately from the acquisition of the point cloud data by using a camera included in the laser scanner to the individual coordinates (x, y, z) of the point cloud in accordance with the position and orientation of the camera at the time of photographing.

For the purpose of representing the three-dimensional shapes of real objects in the virtual space 42 associated with the real space 41 as described above, it is possible to construct three-dimensional space data by using point cloud data as a basic unit (basic component). In this specification, this basic unit will be referred to as a three-dimensional shape element.

In the embodiment of the present invention, in order to simplify the explanation, the acquired point cloud data is converted into a data structure called voxels by using a known method, such as OctoMap ("OctoMap: An Efficient Probabilistic 3D Mapping Framework Based on Octrees" in Autonomous Robots, 2013; A. Hornung, K. M. Wurm, M. Bennewitz, C. Stachniss, and W. Burgard (http://dx.doi.org/10.1007/s10514-012-9321-0) DOI: 10.1007/s10514-012-9321-0.). A voxel is a unit component of a three-dimensional space, corresponding to a pixel of a two-dimensional space, and is a cube having a certain size and identified by using coordinates in the three-dimensional space.

Figure 6D:
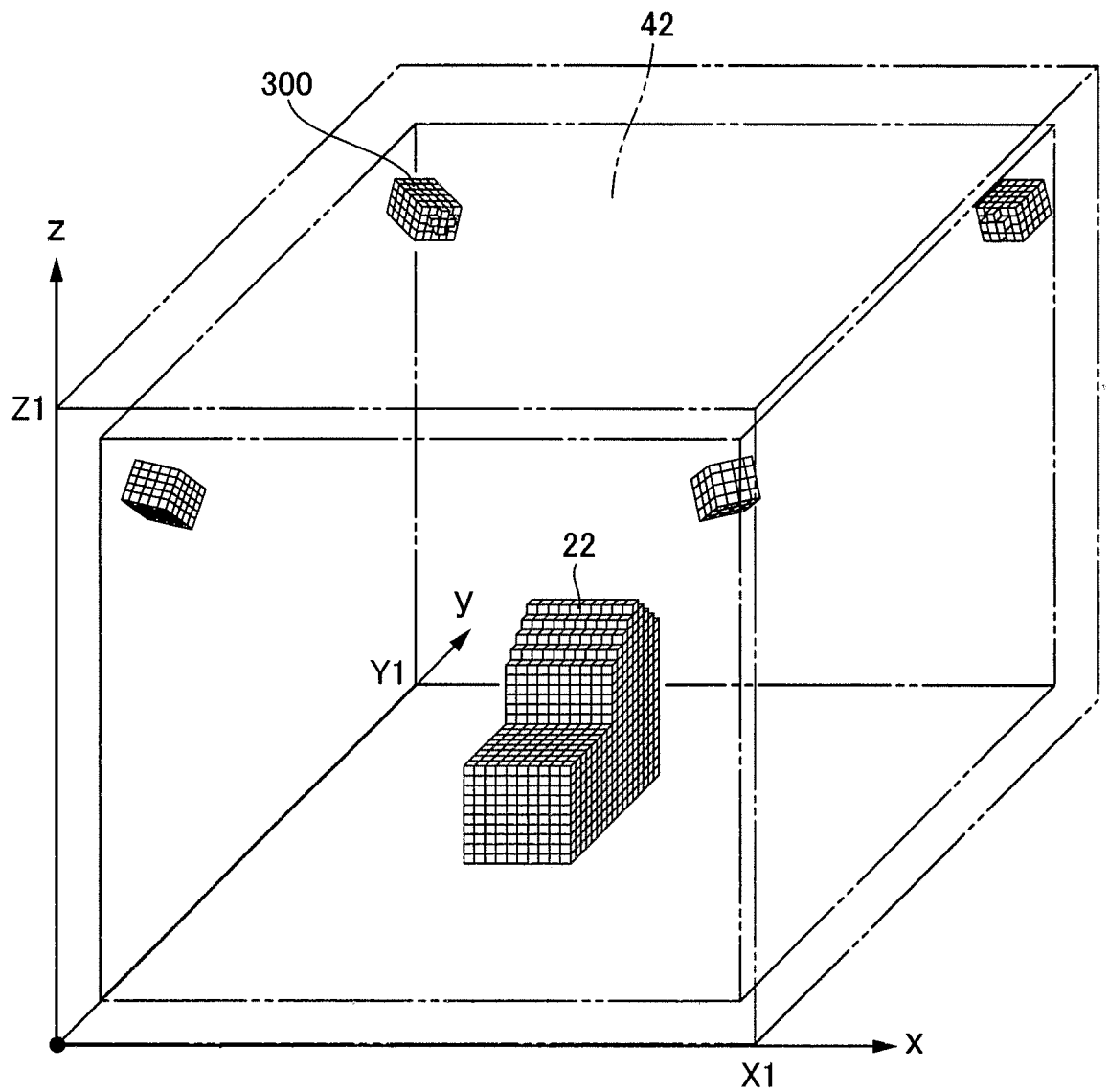
FIG. 6d shows three-dimensional space data represented by voxels created from the point cloud data in FIG. 6c.

It is assumed hereinafter that, in a first embodiment, three-dimensional space data representing the three-dimensional shapes of real objects in the virtual space 42 associated with the real space 41 are constituted of voxels. In this case, the voxels serve as three-dimensional shape elements of the three-dimensional space data. FIG. 6d shows the three-dimensional space data represented by voxels created from the point cloud data in FIG. 6c. Alternatively, however, it is possible to use meshes (3D meshes) as three-dimensional shape elements or to use the point cloud data themselves as three-dimensional shape elements, as will be described later.

In the embodiment of the present invention, for example, a real space is divided into voxel volumes each having a size of 1 cm³ to set a voxel space (a three-dimensional space represented by voxels). Each voxel V has one or more pieces of color information c as viewed from the stationary cameras 300 in addition to position information x, y, and z.

$$V = \{x, y, z, c_0, c_1, c_2, \ldots, c_r\} \quad (1)$$

The color information c is represented in a format such as RGB or HSV. In the case of representation in the HSV format, the color information includes hue, chroma, and lightness.

Furthermore, in the embodiment of the present invention, the virtual space 42 is considered as being limited to a region associated with the real space 41 ($0 \leq X \leq X1$, $0 \leq Y \leq Y1$, $0 \leq Z \leq Z1$). Alternatively, however, it is possible to set virtual spaces 42 for smaller regions and associate the plurality of virtual spaces individually with real spaces 41, or to set a virtual space 42 for a larger region. In the case where virtual spaces 42 are set for smaller regions, stationary cameras 300 are installed individually at a plurality of fixed points where it is possible to photograph a region viewable by a user in each of the real spaces 41 associated with the individual virtual spaces 42.

In one example, in the case where the real space 41 is a wide space, preferably, virtual spaces 42 are set individually for a plurality of areas, and servers 100 are also installed individually for the plurality of areas. For example, in the case where the storage units 104 of the servers 100 store voxel data, each voxel V in equation (1) has 10 bytes assuming that 1 voxel=(int16 x, int16 y, int16 z, int32 rgb). When a real space is considered in terms of a model in the form of a set of voxels each having a size of 10 mm³, 1000 mm³=1,000,000 voxels, and the data size is about 10 Mbytes. In the case where a wide space such as a theme park is converted into a high-precision voxel space, assuming that the region of the theme park is divided into grids each having a size of 10 m=10,000 mm, since the volume of each grid is 10,000 m³, the number of voxels is about 1,000,000,000. When the space is reduced to a height of up to 5 m, the number of voxels is about 500,000,000. That is, even if a memory is allocated naively for 500,000,000 voxels, 5 GBytes suffice for storage, and thus it is easy to allocate a server for each grid so as to realize an on-memory implementation.

Figure 7:
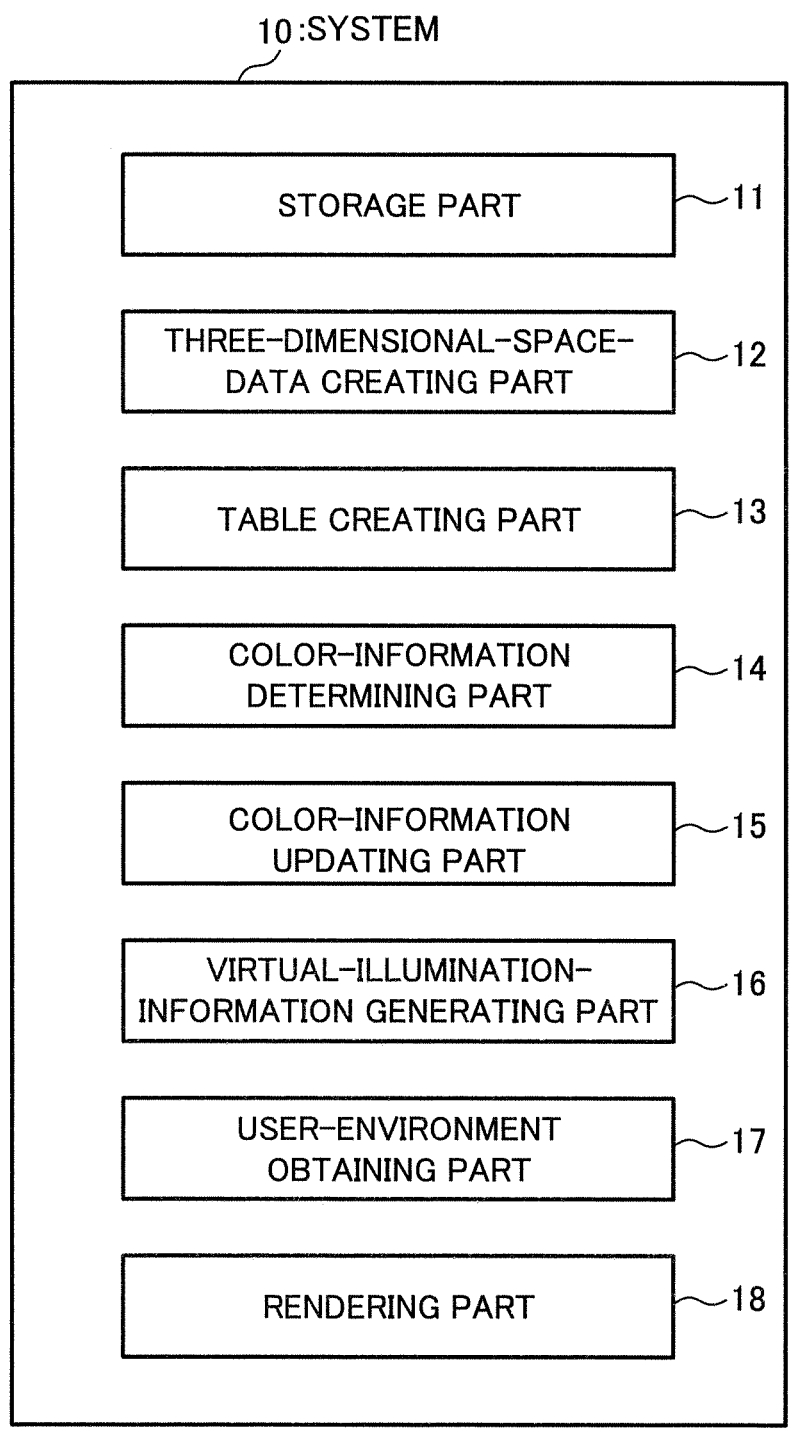
FIG. 7 is a functional block diagram of the system according to the embodiment of the present invention.

FIG. 7 shows a functional block diagram of the system according to the embodiment of the present invention. The system 10 includes a storage part 11, a three-dimensional-space-data creating part 12, a table creating part 13, a color-information determining part 14, a color-information updating part 15, a virtual-illumination-information generating part 16, a user-environment obtaining part 17, and a rendering part 18.

These functions are realized by the server 100 executing programs, by the HMD 200 executing programs, or by the server 100 executing programs and the HMD 200 executing programs. Since various kinds of functions are realized by reading programs, the function of one part may partially be implemented in another part. As described above, the present system is realized by at least one of the server 100 and the HMD 200 having the various kinds of functions shown in FIG. 7.

The storage part 11 is included in both the server 100 and the HMD 200 and has functionality for storing programs, data, etc. in the storage unit 104 or 204. In one example, the storage part 11 included in the server 100 stores, in the storage unit 104, data relating to the positions and movements of virtual objects located in the virtual space 42 and three-dimensional data of the virtual objects, and the storage part 11 included in the HMD 200 temporarily stores a rendering command received from the server 100 in the storage unit 204, whereby rendering processing is executed. In another example, the storage part 11 performs data input/output to/from various kinds of databases.

The three-dimensional-space-data creating part 12 converts point cloud data representing the three-dimensional shapes of real objects in the virtual space 42 associated with the real space 41 into voxels, thereby creating three-dimensional space data (three-dimensional voxel data).

Here, since the point cloud data is colored point cloud data, the voxels that are created are colored voxels. Furthermore, each of the voxels has three-dimensional position information. For example, as the three-dimensional position information, each voxel has the three-dimensional coordinates (x, y, z) of the cubic vertex nearest the origin of three-dimensional coordinates set in the virtual space.

Preferably, the three-dimensional-space-data creating part 12 is included in the server 100. However, in the case where three-dimensional space data is created in advance and is stored in the storage unit 104 or the like, the system 10 need not include the three-dimensional-space-data creating part 12.

The storage part 11 included in the server 100 includes a three-dimensional-space-data storage part for storing the created three-dimensional space data in the storage unit 104. In one example, the server 100 has the functionality of a database server, and the server 100 outputs the stored three-dimensional space data as appropriate in response to queries relating to three-dimensional position information. Alternatively, however, the storage part 11 included in the HMD 200 may include a three-dimensional-space-data storage part for storing the three-dimensional space data in the storage unit 204.

The table creating part 13 creates a table by associating the position information of the individual pixels of images acquired by the stationary cameras 300 with the three-dimensional position information of one or more voxels represented by the individual pixels. This will be described with reference to FIG. 8.

Figure 8:
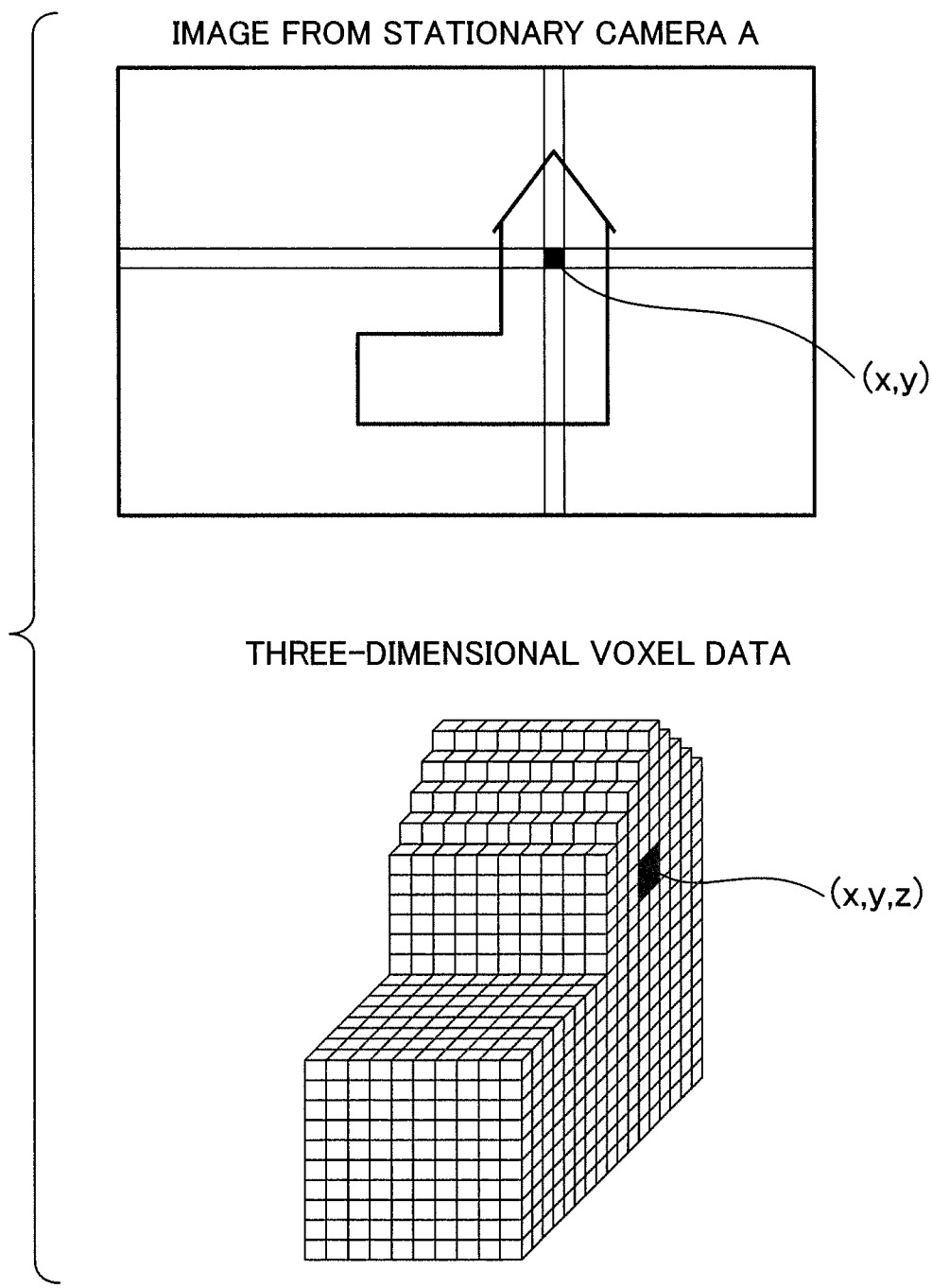
FIG. 8 is an illustration for explaining association between the position information of each of the pixels of images acquired by stationary cameras and the three-dimensional position information of voxels represented by that pixel.

As shown in FIG. 8, an arbitrary single pixel (x, y) of an image acquired by a single stationary camera 300a among the stationary cameras 300 reflects a micro-region of a real object in the real space. The reflecting micro-region corresponds to a plurality of voxels (x, y, z) in the voxel space. However, there are cases where an arbitrary single pixel corresponds to a single voxel.

Here, as described earlier, each of the voxels has color information. Furthermore, the stationary cameras 300 are fixed at predetermined points, and the three-dimensional position information of the stationary cameras 300 in the virtual space 42 is stored as three-dimensional space data. For example, as shown in FIG. 6c, the three-dimensional coordinates of the stationary cameras 300 are stored as three-dimensional space data by acquiring, in advance, point cloud data representing the three-dimensional shapes of the stationary cameras 300, which are real objects.

Therefore, by comparing the three-dimensional position information and color information of voxels (point cloud data) with image data photographed by the stationary cameras 300, it is possible to associate the position information (two-dimensional coordinates) of each pixel of the image data with the position information (three-dimensional coordinates) of the voxels corresponding to the micro-region of a real object represented by that pixel. In this manner, the table creating part 13 creates a table by associating the position information of the pixels of images photographed by the stationary cameras 300 with the three-dimensional position information of voxels represented by the individual pixels. In one example, this association is made by using similarity between the three-dimensional position information and color information of voxels in the three-dimensional space data and the position information and color information of the image data photographed by the stationary cameras 300.

Furthermore, this association makes it possible to determine the three-dimensional position information and photographing directions (e.g., 6DOF coordinates) of the stationary cameras 300 with high precision.

Preferably, the table creating part 13 is included in the server 100. However, in the case where table data is created in advance and is stored in the storage unit 104 or the like, the system 10 need not include the table creating part 13.

The storage part 11 included in the server 100 further includes a table storage part for storing the created table in the storage unit 104. The stored table can be used, for example, as a table that is referred to from databases. In another example, the storage part 11 included in the HMD 200 further includes a table storage part for storing the created table in the storage unit 204.

The color-information determining part 14, by using the created table, determines color information of individual voxels representing the three-dimensional shapes of real objects in the real space 41. Here, the color information of colored voxels created from colored point cloud data is used only in creating the table described above.

In the case where (the position information of) a certain single voxel is associated with (the position information of) only a single pixel of an image photographed by a single stationary camera 300, the color-information determining part 14 determines the color information of that pixel as the color information of that voxel.

In the case where a certain single voxel is associated with individual pixels of images individually photographed by a plurality of stationary cameras 300, the color-information determining part 14 determines, as the color information of that voxel, the color information of a pixel associated with the voxel in the image acquired by a stationary camera 300 that reflects the micro-region of a real object corresponding to the voxel in the largest size. In this case, however, the color information of an arbitrary single pixel among the pixels associated with the voxel in the table created by the table creating part 13 may be determined as the color information of the voxel.

As described earlier, the system 10 according to the embodiment of the present invention uses the color information of voxels as indirect illumination for rendered virtual objects in global illumination. Preferably, the color-information determining part 14 is included in the server 100, and the color information of voxels, determined by the color-information determining part 14, is stored in the storage unit 104 in association with the individual voxels.

In one example, the color information of a voxel is stored as an element of the three-dimensional space data together with the three-dimensional position information, as expressed in equation (1). In another example, the color information of a voxel is stored as table data in a database.

In another example, in the case where a certain single voxel is associated with individual pixels of images individually photographed by a plurality of stationary cameras 300, color information obtained by averaging the color information of the individual pixels may be determined as the color information of that voxel. Alternatively, color information obtained by weighting the color information of the individual pixels may be determined as the color information of the voxel.

In the case where a change in the color information of a pixel of an image acquired by a stationary camera 300 satisfies a predetermined condition, the color-information updating part 15 updates (newly determines), by using the latest color information of that pixel, the color information of the voxel determined by the color-information determining part 14 by using the color information of the pixel.

In one example, the case where a change in the color information of a pixel satisfies a predetermined condition is the case where the latest color information of that pixel is located within a certain distance range (the distance in the HSV color space or the like) of the original color information of that pixel. In another example, the case where a change in the color information of that pixel satisfies a predetermined condition is the case where, for each single pixel, the average of the color information of the past 30 image frames is located within a certain distance range of the original color information of that pixel.

If a change in color information satisfies a predetermined condition, as described above, it is possible to determine that the change is attributable to the state of light, and thus it is possible to update the color information of a voxel such that the latest color information of the pixel at the time of the determination is reflected in that voxel. Meanwhile, in the case where an image acquired by a stationary camera 300 includes a person passing by that camera, the color-information updating part 15 determines that color changes at the pixels representing that person are not within the certain distance and thus does not update the color information of the voxels.

Preferably, the color-information updating part 15 is included in the same device as the color-information determining part 14; that is, preferably, the color-information updating part 15 is included in the server 100.

In order to render shades in consideration of indirect illumination, the virtual-illumination-information generating part 16 generates virtual illumination information for virtual objects to be rendered on the basis of the color information and three-dimensional position information of voxels. Since the virtual illumination information is based on the color information of voxels, the virtual illumination information is also updated when the color information of voxels is updated. Preferably, the virtual-illumination-information generating part 16 is included in the same device as the color-information updating part 15; that is, preferably, the virtual-illumination-information generating part 16 is included in the server 100.

In one example, on the basis of color information and three-dimensional position information of voxels, virtual illumination information for the individual faces of a virtual polyhedron accommodating a virtual object to be rendered is generated as virtual illumination information for the virtual object to be rendered. Here, the virtual illumination information is used assuming that each of the faces of the virtual polyhedron serves as indirect illumination (a light source), as in the method of image-based lighting (IBL). As described above, according to the embodiment of the present invention, since texture obtained from the real space is mapped in real time to real objects that serve as sources of ambient light (indirect illumination), IBL for virtual objects that move also becomes possible. Conventionally, in the case where a virtual object is rendered by way of IBL, since it has been necessary to install cameras for obtaining ambient light in all directions from a rendering point, it has been difficult to apply IBL to a virtual object that moves freely, such as a game character.

The user-environment determining part 17 determines the position of the HMD 200 worn by the user and the photographing direction of the photographing unit 203. Preferably, the user-environment determining part 17 is included in the server 100.

Specifically, the user-environment determining part 17 obtains a rough position of the HMD 200 and the photographing direction of the photographing unit 203 by using the position and orientation sensors 206 and considers the position and photographing direction as a provisional user environment. Then, the user-environment determining part 17 obtains, from the storage unit 104 or the storage unit 204, the color information and three-dimensional position information of voxels viewable by the user at positions and in directions within a predetermined range from the provisional user environment. Then, the user-environment determining part 17 compares an image of the real space 41 photographed by the photographing unit 203 with the obtained position information and color information of voxels for the purpose of matching, thereby determining the position of the HMD 200 and the photographing direction of the photographing unit 203.

In one example, the position of the HMD 200 and the photographing direction of the photographing unit 203 are determined by matching the pattern of the color information of the photographed image and the pattern of the obtained color information of voxels. In the embodiment of the present invention, the position of the HMD 200 corresponds to the position of the user, and the photographing direction of the photographing unit 203 corresponds to the direction in which the user is facing.

FIG. 9 is an illustration for explaining the direction in which the user is facing and the photographing direction of the photographing unit 203. In the case where the user is present at the position shown in FIG. 9, the photographed image of the real space 41 photographed by the photographing unit 203 is as shown in the lower part of FIG. 9. The pattern of the color information of the photographed image is compared, for the purpose of matching, with the pattern of the color information of voxels in the photographing directions of the photographing unit 203 at the position of the HMD 200 obtained by the position and orientation sensors 206 and positions within a certain range of that position and directions within a certain range of those directions. This makes it possible to determine the position of the HMD 200 and the photographing direction of the photographing unit 203.

The rendering part 18 renders virtual objects on the display unit 202 of the HMD 200. In one example, the CPU included in the server 100 writes a rendering command to the main memory and sends the rendering command to the HMD 200. The GPU included in the HMD 200 refers to the received rendering command and writes rendering data to the frame buffer on the video memory or the like, and renders the content read from the frame buffer as is on the display unit 202.

In creating the rendering command, the rendering part 18 determines the positions and orientations of virtual objects to be displayed on the display unit 202 by using the position of the HMD 200 and the photographing direction of the photographing unit 203, determined by the user-environment determining part 17. Furthermore, in creating the rendering command, the rendering part 18 adds shades to the virtual objects by using virtual illumination information.

As described above, preferably, the rendering part 18 is executed by sharing the work between the server 100 and the HMD 200. However, the configuration may be such that the server 100 includes the rendering part 18, the server 100 sends image data to the HMD 200 after executing the entire rendering processing, and the HMD 200 displays the received image data. Alternatively, the configuration may be such that the HMD 200 includes the rendering part 18 and the HMD 200 executes the entire rendering processing.

Figure 10:
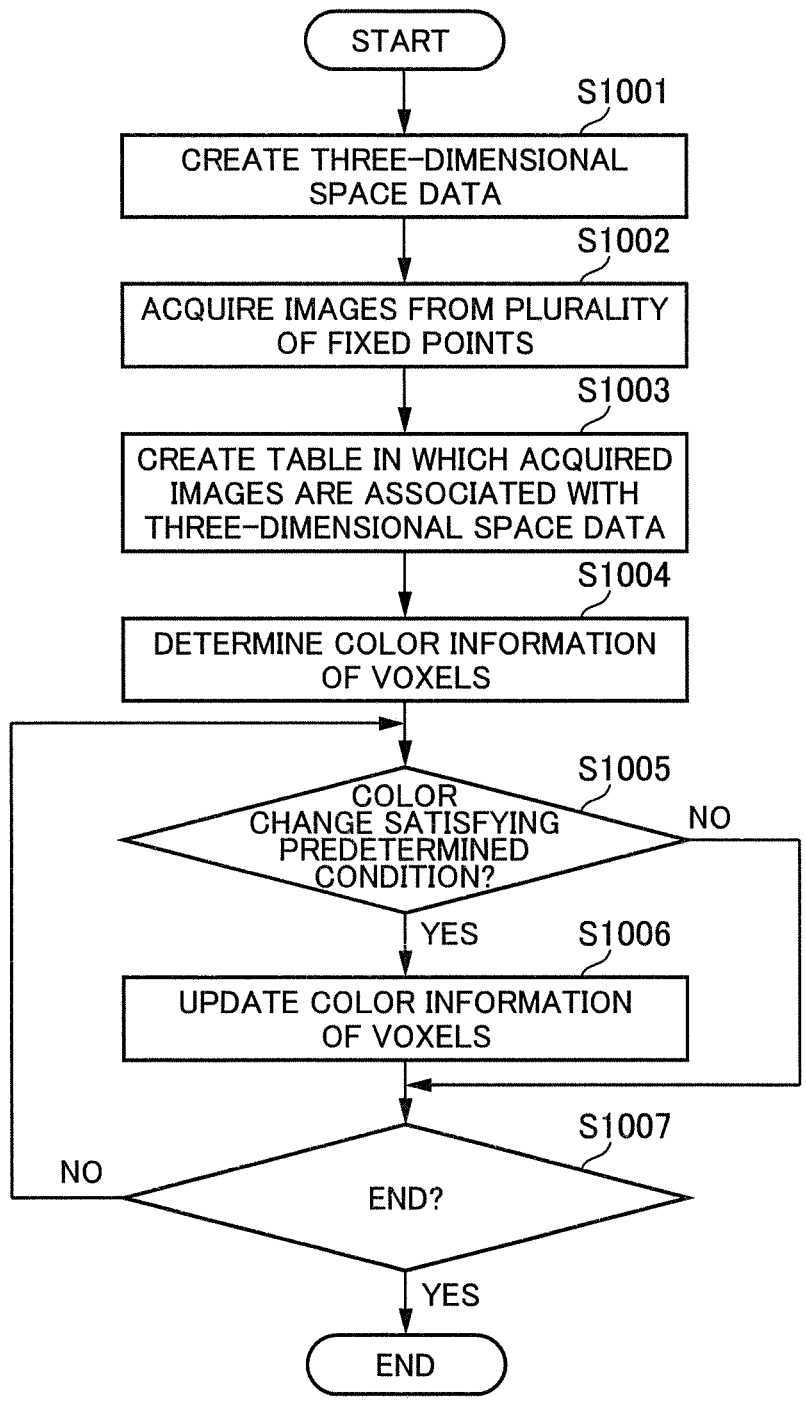
FIG. 10 is a chart showing a method of creating a mixed-reality environment in which the environment of a real space is reflected to a virtual space in real time according to the embodiment of the present invention.

Next, the generation phase will be described. FIG. 10 shows a method of creating the mixed-reality environment 43 in which the environment of the real space 41 is reflected in real time in the virtual space 42 according to the embodiment of the present invention. As shown in FIG. 6a, in the real space 41, the stationary cameras 300 are installed in advance at a plurality of fixed points where it is possible to photograph a region in the real space 41 viewable by the user.

First, colored point cloud data representing the three-dimensional shapes of real objects in the real space 41 is obtained in advance by using a laser scanner (not shown), and the colored point cloud data is converted into voxels to create three-dimensional space data (three-dimensional voxel data) (step 1001).

Then, images are acquired from the stationary cameras 300 installed in advance (step 1002). Alternatively, however, since it is possible to acquire images after the stationary cameras 300 are installed, this step may be executed prior to step 1001.

Then, by comparing the three-dimensional position information and color information of voxels with the image data photographed by the stationary cameras 300, a table in which the position information (two-dimensional coordinates) of each of the pixels of the image data is associated with the position information (three-dimensional coordinates) of one or more voxels corresponding to the micro-region of a real object represented by that pixel is created (step 1003).

By using the table created as described above, the color information of individual voxels representing the three-dimensional shapes of real objects in the real space 41 is determined (step 1004). In this step, for each voxel associated with only a single pixel of an image photographed by a single stationary camera 300, the color information of that pixel is determined as the color information of that voxel. Furthermore, in this step, for each voxel associated with individual pixels of images individually photographed by a plurality of stationary cameras 300, the color information of a pixel associated with that voxel in the image acquired by a stationary camera 300 that reflects the micro-region of a real object corresponding to the voxel in the largest size is determined as the color information of the voxel.

Alternatively, however, for each voxel associated with individual pixels of images individually photographed by a plurality of stationary cameras 300, color information obtained by averaging the color information of the individual pixels may be determined as the color information of that voxel.

Then, it is determined, for each of the pixels of the images acquired by the plurality of stationary cameras 300, whether or not a change in the color information satisfies a predetermined condition (step 1005). For example, the predetermined condition for each pixel is whether or not the average of the color information of the past 30 image frames is within a certain distance range (a distance in the HSV color space or the like) of the original color information of that pixel.

For each pixel satisfying the predetermined condition, the color information of a voxel for which the color information of that pixel is referred to in determining the color information of that voxel is updated (determined) by using the latest color information of the pixel (step 1006). For each pixel not satisfying the predetermined condition, the color information of a voxel for which the color information of that pixel is referred to in determining the color information of that voxel is not updated (determined). Then, if the mixed-reality environment 43 should continue to be created (step 1007), the processing returns to step 1005.

Figure 11:
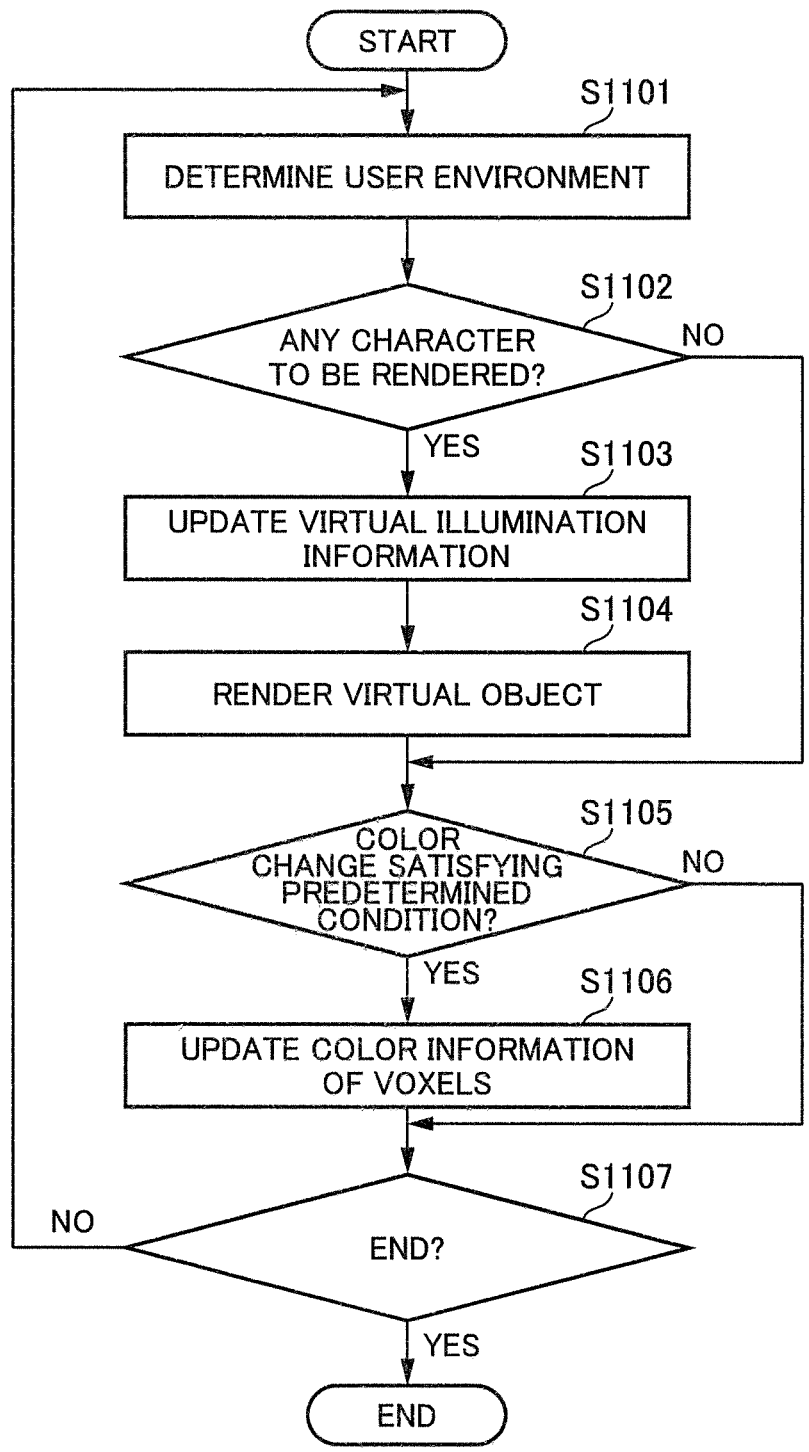
FIG. 11 is a chart showing a method of providing global illumination utilizing the state of light in the real space and high-precision position tracking of the user, which enables the user to experience a sense of mixed reality in the mixed-reality environment created as shown in FIG. 10.

Next, the recognition phase will be described. FIG. 11 shows a method of global illumination utilizing the state of light in the real space 41 and high-precision position tracking of a user according to the embodiment of the present invention, which enables the user to experience a sense of mixed reality in the mixed-reality environment 43 created as shown in FIG. 10. It is assumed that the user is wearing the HMD 200 and is present in the real space 41 (the mixed-reality environment 43). Furthermore, note that the color information of individual voxels is already determined (updated) in step 1004 or 1006 in FIG. 10 when this step is started.

The user environment, i.e., the position of the user and the direction in which the user is facing, is determined by determining the position of the HMD 200 and the photographing direction of the photographing unit 203 (step 1101). In this step, as a provisional user environment, a rough position of the HMD 200 and the photographing direction of the photographing unit 203 are obtained by using the position and orientation sensors 206. Furthermore, in this step, the color information and three-dimensional position information of voxels that can be photographed by the photographing unit 203 at positions and in photographing directions within a predetermined range from the provisional user environment are obtained. Furthermore, in this step, the position of the HMD 200 and the photographing direction of the photographing unit 203 are determined by comparing a photographed image of the real space photographed by the photographing unit 203 with the obtained position information and color information of voxels for the purpose of matching.

Then, it is determined whether or not there is any virtual object to be rendered in the photographing direction of the photographing unit 203 (step 1102). Here, in the case where a virtual object is located in a place corresponding to the photographing direction of the photographing unit 203 in the virtual space 42 constituting the mixed-reality environment 43, it is determined that there is a virtual object to be rendered.

In the case where there is a virtual object to be rendered, virtual illumination information on the individual faces of a virtual polyhedron accommodating the virtual object to be rendered is generated as virtual illumination information for the virtual object to be rendered via IBL using the color information and three-dimensional position information of voxels (step 1103).

Alternatively, virtual illumination information for the virtual object to be rendered may be generated via ray tracing using the color information and three-dimensional position information of voxels.

Then, the position and direction are determined by using the position of the HMD 200 and the photographing direction of the photographing unit 203, determined in step 1101, and the virtual object to which shades (colors) are added by using the virtual illumination information generated in step 1103 is rendered on the display unit 202 of the HMD 200 (step 1104). In the case where there is no virtual object to be rendered, steps 1103 and 1104 are skipped.

The next step 1105 is the same processing as step 1005 in FIG. 10, and step 1106 is the same processing as step 1006 in FIG. 10, and thus descriptions of these steps will be omitted. Then, as long as the mixed-reality environment (global illumination and position tracking) is continuously provided (step 1107), the processing returns to step 1101.

As described above, in the embodiment of the present invention, colored point cloud data representing the three-dimensional shapes of real objects in the real space 41 is obtained in advance by using a laser scanner. Note, however, that since measurement by means of a laser scanner takes time, measurement is conducted just once at the beginning unless the positions, shapes, etc. of real objects change.

Next, the operation and advantages of the system 10 according to the first embodiment of the present invention will be described. In this embodiment, by using a table in which the position information of voxels is associated with the position information of individual pixels of images acquired by the stationary cameras 300, the color information of voxels is determined and updated according to the color information of the pixels of the images acquired by the stationary cameras 300. By using the table in this manner, it becomes possible to reflect the color information acquired by the stationary cameras 300 in real time in the individual voxels. This makes it possible to recognize the colors of the real space 41 with high precision and in real time in the mixed-reality environment in which the shapes in the real space are reproduced with high precision and to reflect the colors in the virtual space.

Furthermore, in this embodiment, the individual voxels in which the colors of the real space 41 are reflected are used as virtual indirect illumination (light sources) for virtual objects that are rendered. This makes it possible to realize global illumination utilizing the state of light in the real space 41, which makes it possible to render virtual objects having colors and shades extremely close to those in the environment of the real space 41.

Furthermore, in this embodiment, it becomes possible to utilize the real space 41 as the virtual space 42 in the real space 41. For example, it becomes possible for a game developer to handle a real space in the same manner as a game space (virtual space) in a game engine.

Furthermore, in this embodiment, for a virtual object to be rendered, a virtual polyhedron accommodating the virtual object is assumed, and the states of colors (light) on the individual faces of the polyhedron are determined individually from voxels reflecting the colors of the real space 41. Then, the determined states of colors on the individual faces are used as virtual indirect illumination for virtual objects that are rendered. This makes it possible to render virtual objects having colors and shades even closer to those in the environment of the real space 41.

Furthermore, in this embodiment, a rough position of the HMD 200 and the photographing direction of the photographing unit 203, determined by using the position and orientation sensors 206, are considered as a provisional user environment, and the color information and three-dimensional position information of voxels located in a region that can be photographed by the photographing unit 203 in the vicinity of the provisional user environment are compared with an image photographed by the photographing unit 203 for the purpose of matching, the position of the HMD 200 and the photographing direction of the photographing unit 203 are determined. As described above, by performing matching between the rough position information acquired from the conventional position and orientation sensors 206 and the high-precision virtual space 42 generated by using three-dimensional space data, it is possible to correct in real time the deviations in the position of the user and the direction in which the user is facing between the real space 41 and the virtual space 42. This makes it possible to realize a mixed-reality environment 43 that is linked with reality with high precision, which makes it possible to realize position tracking.

Second Embodiment

In this embodiment, meshes are used as three-dimensional shape elements. Similarly to the case of the first embodiment, colored point cloud data that have been obtained are converted into a data structure called meshes. For example, from the colored point cloud data that have been obtained, a polygon having vertices at the individual point clouds is formed by using a known method, and the polygon is converted into meshes formed of one or more polygons. However, since the basic idea is the same as that in the case of voxels in the first embodiment, the description will be directed mainly to points that differ from the first embodiment.

The table that is created by the table creating part 13 in this embodiment will be described. As described earlier, it is possible to determine the three-dimensional position information and photographing directions of the stationary cameras 300 with high precision. By comparing the obtained colored point cloud data with the individual pixels of images acquired by the stationary cameras 300, a projection matrix (transformation matrix) for converting the color information of the pixels, acquired from the stationary cameras 300, into the color information of point clouds is obtained. Known methods for this purpose include a method based on optical flow and a method based on similarity of color information.

The table creating part 13 creates the projection matrix described above. The matrix is a table for converting the coordinate system of images acquired by the stationary cameras 300 into a coordinate system for a three-dimensional space. In one example, a table for converting the coordinate system of images acquired by the stationary cameras 300 into UV coordinates of meshes in a three-dimensional space is created.

A specific example regarding the projection matrix will be described below. When it becomes possible to obtain the position information of the stationary cameras 300, it becomes possible to set a projection matrix and to map pixels of images from the stationary cameras 300 to the colors of a place where an object is located in the three-dimensional space, as described below. Let the projection matrix be signified by P. P is a 3×4 matrix in the form of A(R|t). A is a matrix obtained from the image angles, resolutions, image centers, etc. of the stationary cameras 300 and having fixed values that depend on the device specifications, and will also be referred to as an internal parameter matrix. R is a 3×3 rotational matrix, and t is a translational vector. A 3×4 matrix formed by arraying R|t will be referred to as an external parameter matrix. A corresponds to the specification values of the stationary cameras 300. R|t represents a rotation and a position in the world coordinate system and can be obtained by matching point cloud data with images from the stationary cameras 300 in this embodiment. Accordingly, it becomes possible to convert image coordinates m into world coordinates X by using the ordinary formula of projective transformation m=P·X.

The color-information determining part 14 determines the color information of individual meshes by using the transformation matrix to transform the color information of the individual pixels of images acquired by the stationary cameras 300. Preferably, the images referred to for the color information of the individual meshes, i.e., the stationary cameras 300 that serve as sources of the color information of the individual meshes, are determined in advance.

In the case where a change in the color information of a pixel of an image acquired by a stationary camera 300 satisfies a predetermined condition, the color-information updating part 15 updates (newly determines) the color information of a mesh, determined by the color-information determining part 14 by using the color information of that pixel, by using the latest color information of the pixel.

Also in steps 1004 to 1006 and steps 1105 to 1106, processing is executed similarly to the case described above.

As described above, the color information of meshes in this embodiment is obtained by using a transformation matrix to transform the color information of the pixels of images acquired by the stationary cameras 300. Therefore, note that different colors are included within a single mesh, which differs from the first embodiment, in which the color information is the same within each voxel.

Third Embodiment

Figure 12:
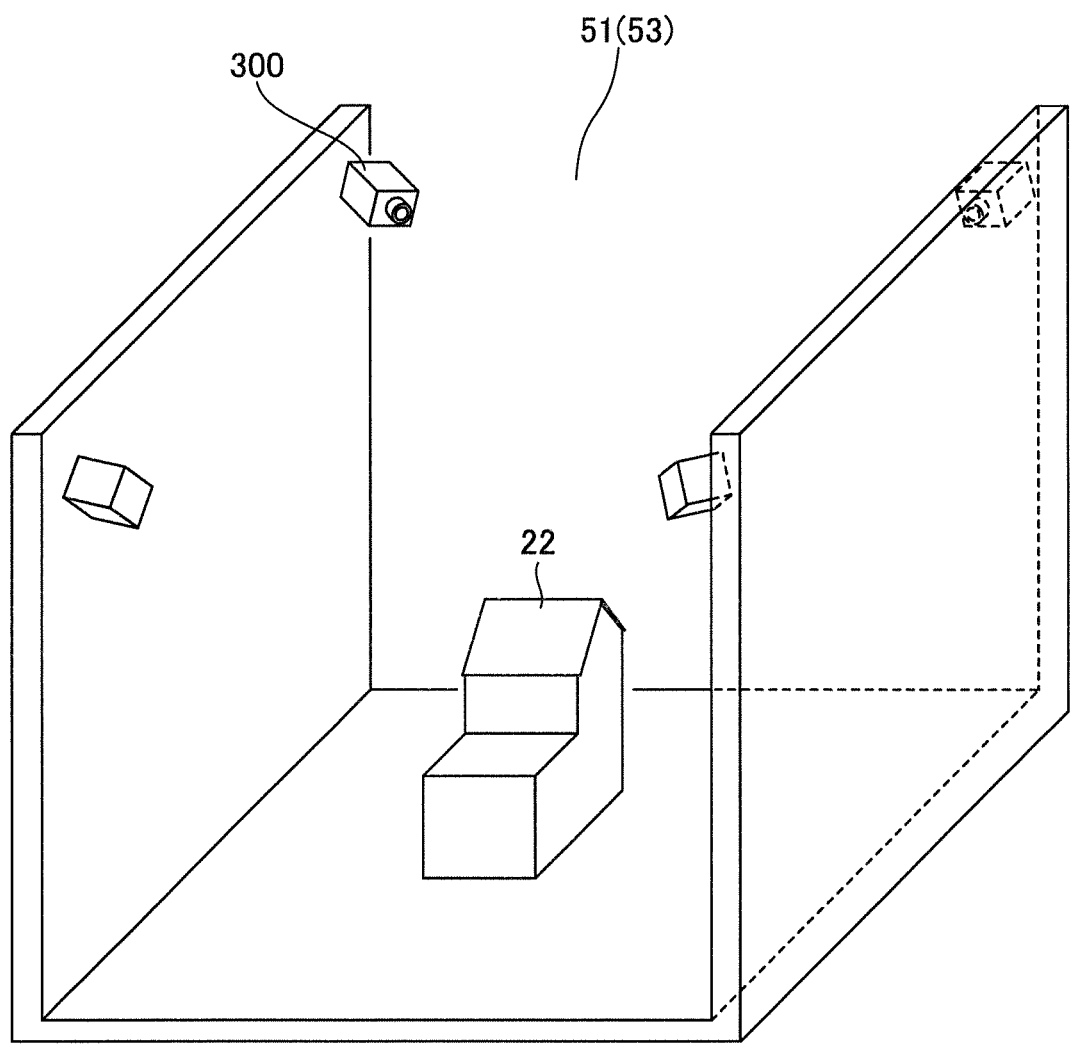
FIG. 12 is a schematic illustration of a real space according to an embodiment of the present invention.

As a real-world space (predetermined real space) in which the system 10 according to the embodiment of the present invention provides a user with a mixed-reality environment 53, a real space 51, which is an outdoor space as shown in FIG. 12, is assumed. The real space 51 is the same as the real space 41 except in that the ceiling and a pair of side walls are omitted and the light source 22 including sunlight is provided outside the real space instead of inside the real space. Also in the real space 51, the stationary cameras 300 are installed individually at a plurality of fixed points where it is possible to photograph a region in the real space 51 viewable by the user. Furthermore, although it is assumed that voxels are used as three-dimensional shape elements in this embodiment in order to simplify the explanation, alternatively, meshes or point cloud data may be used as three-dimensional shape elements. The following description will be directed mainly to points that differ from the first embodiment.

Also in this embodiment, the virtual space 52 is considered as being limited to a region associated with the real space 51 ($0 \leq X \leq X1$, $0 \leq Y \leq Y1$, $0 \leq Z \leq Z1$).

Since this embodiment involves an outdoor space, as opposed to the first embodiment, there exists a region where the stationary cameras 300 do not reflect real objects.

In the case where there is no real object in at least a portion of an image acquired by a stationary camera 300, for each pixel not reflecting a real object in that image, the table creating part 13 associates that pixel with a position (x, y, z) on the interface of the virtual space 52 by using the three-dimensional position information and photographing direction of the stationary camera 300. In this case, for example, while assuming that a large mesh (or voxel) exists at the position of the interface, a table may be created by using the method described in the context of the first or second embodiment.

By using the created table, the color-information determining part 14 determines the color information for individual position information at the interface of the virtual space 52.

In the case where a change in the color information of a pixel in an image acquired by a stationary camera 300 satisfies a predetermined condition, the color-information updating part 15 updates (newly determines) the color information (e.g., of a mesh) at the position of the interface of the virtual space 52, determined by the color-information determining part 14 by using the color information of that pixel, by using the latest color information of the pixel.

Also in steps 1004 to 1006 and steps 1105 to 1106, processing is executed similarly to the case described above.

[System Architecture]

A system architecture according to one embodiment, having the functions shown in FIG. 7 as described above, can be constituted of the following six modules. The six modules are a voxel converter (point cloud to voxel converter), a voxel DB, a 3D address mapping table generator (hereinafter referred to as the "generator"), a 3D address mapping table (hereinafter referred to as the "table"), a position tracker, and ambient illumination parameters. This modularization makes it possible to modify some of the modules and to apply the modified modules to the system.

The voxel converter, by using a method such as Octomap, converts point cloud data obtained in advance and stored in a cloud into a gapless set of voxels. This conversion into voxels facilitates utilization as 3D information directly used in a game and makes it easier to uniquely identify a voxel by using coordinates, and thus voxels are a suitable format for updating colors.

The voxel converter has functionality corresponding to the three-dimensional-space-data creating part 12. Note that since the embodiment of the present invention does not depend on the method using voxels, a mesh converter that converts point cloud data into a gapless set of meshes may be adopted as a constituent module instead of the voxel converter.

The voxel DB is a database created by dividing the real world into volumes of a certain size, converting the entire contents of the individual volumes into voxels, and making it possible to identify the individual voxels by using position information represented in the form (x, y, z). Preferably, the voxel space is a high-precision voxel space in which a physical space can be mapped by using, as minimum units, voxels corresponding to a certain minimal size (e.g., 1 cm) in the real world.

The voxel DB has functionality corresponding to a database that stores the three-dimensional space data created by the three-dimensional-space-data creating part 12. Note that the embodiment of the present invention does not depend on the method using voxels, and point cloud data may be directly stored or a set of UV coordinates of meshes in the three-dimensional space may be stored in the voxel DB.

In this space, the generator maps the individual pixels of video data and the colored voxels generated from point cloud data by using the position information and color information of the voxels. Note that the embodiment of the present invention does not depend on the method using voxels, and, for example, mapping may be performed by using the position information and color information of a single point in the point cloud data. The functionality of the generator is to perform matching between an image acquired by a stationary camera and point cloud data or voxel data, thereby generating a table for converting the coordinate system of the image acquired by the stationary camera into a coordinate system in the three-dimensional space. The generator has functionality corresponding to the table creating part 13.

The table is a table in which each of the pixels of the stationary cameras is statically associated with n voxels in the three-dimensional space. This table is a set of mapping entries E given below.

$$E=\{cid,cx,cy,vx,vy,vz\} \qquad (2)$$

Here, cid represents the identifier of a stationary camera, cx and cy represent a pixel of the stationary camera, and vx, vy, and vz represent the three-dimensional coordinates of a voxel at the mapping destination. Note that the embodiment of the present invention does not depend on the method using voxels, and vx, vy, and vz may be the coordinates of point cloud data or the UV coordinates of a specific mesh in the three-dimensional space. The table has functionality corresponding to the table created by the table creating part 13.

The position tracker is a module that recognizes the visual field of the user by continuously tracking the current position and viewing direction of the user. The position tracker has functionality corresponding to the user-environment determining part.

The ambient illumination parameters constitute a module that obtains the position of a character to be displayed in the real world in the form of x, y, and z corresponding to a query to the voxel DB and that calculates global illumination in the vicinity of that place from the color information of the surrounding voxels. The ambient illumination parameters have functionality corresponding to the virtual-illumination-information generating part 16.

In the processing or operation described above, it is possible to freely modify the processing or operation as long as no inconsistency arises in the processing or operation, such as an inconsistency that a certain step involves the use of data that could not yet be available in that step. Furthermore, the embodiments described above are examples for explaining the present invention, and the present invention is not limited to the embodiments. The present invention can be embodied in various forms not departing from the spirit thereof.

REFERENCE SIGNS LIST

10 System
11 Storage part
12 Three-dimensional-space-data creating part
13 Table creating part
14 Color-information determining part
15 Color-information updating part
16 Virtual-illumination-information generating part
17 User-environment obtaining part
18 Rendering part
21 Light source
22 Building
23 Shadow
24 Character
25, 26 Pedestal
27 Walls
31, 41, 51 Real world (real space)
32, 42, 52 Virtual world (virtual space)
33, 43, 53 Mixed-reality world (mixed-reality environment)
50 Network
100 Server
101, 201 Processing unit
102, 202 Display unit
103 Input unit
104, 204 Storage unit
105, 205 Communication unit
110, 210 Bus
200 Display device
203 Photographing unit
206 Position and orientation sensors
300 Stationary cameras

The invention claimed is:

1. A system comprising:
a server;
a portable display device comprising a display unit for displaying a virtual object to a user and a photographing unit that photographs a predetermined real space; and
image acquisition devices that acquire images individually from a plurality of fixed points where a region is photographed in the predetermined real space, wherein the portable display device renders the virtual object in a superimposed fashion on the predetermined real space, viewed by the user via the display unit,
wherein the server or the portable display device is configured to:
store point cloud data, obtained in advance, of real objects located in the predetermined real space, wherein the point cloud data constitutes three-dimensional shape elements each having three-dimensional position information, and wherein the point cloud data is higher precision data than the images acquired by the image acquisition devices;
store a table in which two-dimensional position information of each pixel of the images acquired by the image acquisition devices is associated with the point cloud data;
map, using the table, color information of one or more pixels of the images acquired by the image acquisition devices to the three-dimensional shape elements of the point cloud data;
determine, using the table, whether changes in the color information satisfy a predetermined condition, wherein the predetermined condition corresponds to the changes in the color information being within a predetermined distance range of a color space, wherein the predetermined condition corresponds to an average of the color information from a predetermined number of previous image frames being located within the predetermined distance range of original color information of each pixel of the images acquired by the image acquisition devices, wherein the predetermined number of previous image frames is greater than 1;
update, in response to determining that the changes in the color information satisfy the predetermined condition, the color information of the three-dimensional shape elements based on the changes in the color information of each pixel of the images acquired by the image acquisition devices;
determine a position of the portable display device and a photographing direction of the photographing unit;
generate virtual illumination information for the virtual object to be rendered based on the color information and three-dimensional position information of the three-dimensional shape elements; and
render the virtual object on the display unit based on the position of the display device, the photographing direction of the photographing unit, and the virtual illumination information.

2. A system according to claim 1, wherein the server or the portable display device generates, as virtual illumination information for the virtual object to be rendered, virtual illumination information on individual faces of a virtual polyhedron accommodating the virtual object to be rendered based on the color information and three-dimensional position information of the three-dimensional shape elements.

3. A system according to claim 1,
wherein the portable display device further includes position and orientation sensors, and
wherein the server or the portable display device considers a position of the display device and a photographing direction of the photographing unit, acquired by the position and orientation sensors, as a provisional user environment, obtains, from the server or the portable display device, the three-dimensional shape elements that can be photographed by the photographing unit at positions and in directions within a predetermined range from the provisional user environment, and determines the position of the display device and the photographing direction of the photographing unit based on the color information and three-dimensional position information of the obtained three-dimensional shape elements and the photographed image of the predetermined real space.

4. A system according to claim 1, wherein the three-dimensional shape elements are meshes constituted of polygons created based on the point cloud data, obtained in advance, of the real objects located in the predetermined real space.

5. A system according to claim 1, further comprising:
a three-dimensional laser scanner configured to acquire a 360 degree measurement of the predetermined real space,
wherein the point cloud data is created using the 3D laser scanner simultaneously with the images acquired by the image acquisition devices.

6. A system according to claim 1, wherein the image acquisition devices are stationary cameras disposed around the predetermined real space.

7. A system according to claim 1,
wherein the portable display device is a head mounted display that provides the user with a mixed reality space comprising the predetermined real space and a virtual space comprising the virtual object, and
wherein the virtual illumination information is used by the head mounted display to determine global illumination changes in the mixed reality space based on changes in a state of light in the predetermined real space.

8. A system according to claim 1, wherein the color space corresponds to an HSV format, and wherein the changes in the color information correspond to a change selected from a group consisting of a hue, chroma, and lightness.

9. A portable display device including a display unit for displaying a virtual object to a user and a photographing unit that photographs a predetermined real space, wherein the portable display device renders the virtual object in a superimposed fashion on the predetermined real space, viewed by the user via the display unit,
wherein the portable display device is configured to:
store point cloud data, obtained in advance, of real objects located in a predetermined real space, wherein the point cloud data constitutes three-dimensional shape elements each having three-dimensional position information;
store a table in which two-dimensional position information of each pixel of acquired images that are individually acquired from a plurality of fixed points where a region is photographed in the predetermined real space is associated with the point cloud data, wherein the point cloud data is higher precision data than the acquired images;
map, using the table, color information of one or more pixels of the acquired images to the three-dimensional shape elements of the point cloud data;
determine, using the table, whether changes in the color information satisfy a predetermined condition, wherein the predetermined condition corresponds to the changes in the color information being within a predetermined distance range of a color space,
wherein the predetermined condition corresponds to an average of the color information from a predetermined number of previous image frames being located within the predetermined distance range of original color information of each pixel of the acquired images, wherein the predetermined number of previous image frames is greater than 1;
update, in response to determining that the changes in the color information satisfy the predetermined condition, the color information of the three-dimensional shape elements based on the changes in the color information of the each pixel of the acquired images;
determine a position of the display device and a photographing direction of the photographing unit;
generate virtual illumination information for the virtual object to be rendered based on the color information and three-dimensional position information of the three-dimensional shape elements; and
render the virtual object on the display unit based on the position of the display device, the photographing direction of the photographing unit, and the virtual illumination information.

10. A system comprising:
a server; and
a portable display device comprising a display unit for displaying a three-dimensional virtual object to a user, a photographing unit that photographs a predetermined real space, and position and orientation sensors, wherein the portable display device renders the virtual object in a superimposed fashion on the predetermined real space, viewed by the user via the display unit,
wherein the server or the portable display device is configured to:
store point cloud data, obtained in advance, of real objects located in a predetermined real space, wherein the point cloud constitutes three-dimensional shape elements each having three-dimensional position information;
store a table in which two-dimensional position information of each pixel of acquired images that are individually acquired from a plurality of fixed points where a region is photographed in the predetermined real space is associated with the point cloud data, wherein the point cloud data is higher precision data than the acquired images;
map, using the table, color information of one or more pixels of the acquired images to the three-dimensional shape elements of the point cloud data;
determine, using the table, whether changes in the color information satisfy a predetermined condition, wherein the predetermined condition corresponds to the changes in the color information being within a predetermined distance range of a color space,
wherein the predetermined condition corresponds to an average of the color information from a predetermined number of previous image frames being located within the predetermined distance range of original color information of each pixel of the acquired images, wherein the predetermined number of previous image frames is greater than 1;

update, in response to determining that the changes in the color information satisfy the predetermined condition, the color information of the three-dimensional shape elements based on the changes in the color information of each pixel of the acquired images;

consider a position of the display device and a photographing direction of the photographing unit, acquired by the position and orientation sensors, as a provisional user environment, to obtain, from the server or the portable display device, the three-dimensional shape elements that can be photographed by the photographing unit at positions and in directions within a predetermined range from the provisional user environment; and determine the position of the display device and the photographing direction of the photographing unit based on the color information and three-dimensional position information of the obtained three-dimensional shape elements and the photographed image of the predetermined real space.

11. A method of rendering a virtual object in a superimposed fashion on a predetermined real space, viewed by a user via a display unit of a portable display device in the predetermined real space, the method comprising:

acquiring images individually from a plurality of fixed points where a region is photographed in the predetermined real space;

mapping, using a table, color information of one or more pixels of the acquired images to three-dimensional shape elements of point cloud data, wherein the point cloud data is obtained in advance of real objects located in the predetermine real space, wherein the point cloud data constitutes the three-dimensional shapes each having three dimensional position information and the point cloud data is higher precision data than the acquired images, and wherein the table stores two-dimensional position information of each pixel of acquired images that are individually acquired from a plurality of fixed points where a region is photographed in the predetermined real space is associated with the point cloud data;

determining, using the table, whether changes in the color information satisfy a predetermined condition, wherein the predetermined condition corresponds to the changes in the color information being within a predetermined distance range of a color space, and wherein the predetermined condition corresponds to an average of the color information from a predetermined number of previous image frames being located within the predetermined distance range of original color information of each pixel of the acquired images, wherein the predetermined number of previous image frames is greater than 1;

updating, in response to determining that the changes in the color information satisfy the predetermined condition, the color information of the three-dimensional shape elements based on the changes in the color information of each pixel of the acquired images;

determining a position of the display device and a photographing direction of a photographing unit included in the display device;

generating virtual illumination information for the virtual object to be rendered based on the color information and three-dimensional position information of the three-dimensional shape elements; and rendering the virtual object on the display unit based on the position of the display device, the photographing direction of the photographing unit, and the virtual illumination information.

12. A non-transitory computer readable medium storing a program for a system including a server, a portable display device including a display unit for displaying a virtual object to a user and a photographing unit that photographs a predetermined real space, and image acquisition devices that acquire images individually from a plurality of fixed points where a region is photographed in the predetermined real space, wherein the program renders the virtual object in a superimposed fashion on the predetermined real space, viewed by the user via the display unit, wherein the program contains instructions causing the server to execute:

obtaining the acquired images from the image acquisition devices;

mapping, using a table, color information of one or more pixels of the acquired images to three-dimensional shape elements of point cloud data, wherein the point cloud data is obtained in advance of real objects located in the predetermined real space, wherein the point cloud data constitutes the three-dimensional shapes each having three dimensional position information and the point cloud data is higher precision data than the acquired images, and wherein the table stores two-dimensional position information of each pixel of acquired images that are individually acquired from a plurality of fixed points where a region is photographed in the predetermined real space is associated with the point cloud data;

determining, using the table, whether changes in the color information satisfy a predetermined condition, wherein the predetermined condition corresponds to the changes in the color information being within a predetermined distance range of a color space, and wherein the predetermined condition corresponds to an average of the color information from a predetermined number of previous image frames being located within the predetermined distance range of original color information of each pixel of the acquired images, wherein the predetermined number of previous image frames is greater than 1;

updating, in response to determining that the changes in the color information satisfy the predetermined condition, the color information of the three-dimensional shape elements based on the changes in the color information of the each pixel of the acquired images;

determining a position of the display device and a photographing direction of the photographing unit;

generating virtual illumination information for the virtual object to be rendered based on the color information and three-dimensional position information of the three-dimensional shape elements; and rendering the virtual object on the display unit based on the position of the display device, the photographing direction of the photographing unit, and the virtual illumination information.

13. A method of creating a mixed-reality environment for rendering a three-dimensional virtual object in a superimposed fashion on a predetermined real space viewed by a user via a display unit of a portable display device in a predetermined real space, the method comprising:

creating point cloud data of real objects located in the predetermined real space, wherein the point cloud data constitutes three-dimensional shape elements each having three-dimensional position information;

acquiring images individually from a plurality of fixed points where a region is photographed in the predetermined real space, wherein the point cloud data is higher precision data than the acquired images;

creating a table in which two-dimensional position information of each pixel of the acquired images is associated with the point cloud data;

mapping, using the table, color information of one or more pixels of the acquired images to three-dimensional shape elements of point cloud data;

determining, using the table, whether changes in the color information satisfy a predetermined condition, wherein the predetermined condition corresponds to the changes in the color information being within a predetermined distance range of a color space, and wherein the predetermined condition corresponds to an average of the color information from a predetermined number of previous image frames being located within the predetermined distance range of original color information of each pixel of the acquired images, wherein the predetermined number of previous image frames is greater than 1; and updating, in response to determining that the changes in the color information satisfy the predetermined condition, the color information of the three-dimensional shape elements based on the changes in the color information of each pixel of the acquired images.

14. A system for creating a mixed-reality environment for rendering a three-dimensional virtual object in a superimposed fashion on a predetermined real space viewed by a user via a display unit of a portable display device in a predetermined real space, wherein the system is configured to:

create point cloud data of real objects located in the predetermined real space, wherein the point cloud data constitutes three-dimensional shape elements each having three-dimensional position information;

acquire images individually from a plurality of fixed points where a region is photographed in the predetermined real space, wherein the point cloud data is higher precision data than the acquired images; create a table in which two-dimensional position information of each pixel of the acquired images is associated with the point cloud data;

map, using the table, color information of one or more pixels of the acquired images to three-dimensional shape elements of point cloud data;

determine, using the table, whether changes in the color information satisfy a predetermined condition, wherein the predetermined condition corresponds to the changes in the color information being within a predetermined distance range of a color space, and wherein the predetermined condition corresponds to an average of the color information from a predetermined number of previous image frames being located within the predetermined distance range of original color information of each pixel of the acquired images, wherein the predetermined number of previous image frames is greater than 1; and update, in response to determining that the changes in the color information satisfy the predetermined condition, the color information of the three-dimensional shape elements based on the changes in the color information of each pixel of the acquired images.

* * * * *